US 9,710,120 B2

(12) United States Patent
Chang et al.

(10) Patent No.: US 9,710,120 B2
(45) Date of Patent: Jul. 18, 2017

(54) SENSING APPARATUS

(71) Applicant: Industrial Technology Research Institute, Hsinchu (TW)

(72) Inventors: Chih-Chia Chang, Hsinchu County (TW); Kai-Ming Chang, New Taipei (TW); Kuo-Chang Lee, Pingtung County (TW); Yi-Shou Tsai, Taipei (TW)

(73) Assignee: Industrial Technology Research Insitute, Hsinchu (TW)

( * ) Notice: Subject to any disclaimer, the term of this patent is extended or adjusted under 35 U.S.C. 154(b) by 86 days.

(21) Appl. No.: 14/985,373

(22) Filed: Dec. 30, 2015

(65) Prior Publication Data

US 2016/0313865 A1    Oct. 27, 2016

Related U.S. Application Data

(60) Provisional application No. 62/150,859, filed on Apr. 22, 2015.

(30) Foreign Application Priority Data

Nov. 11, 2015  (TW) .............................. 104137117 A

(51) Int. Cl.
*G06F 3/041*       (2006.01)
*G06F 3/044*       (2006.01)

(52) U.S. Cl.
CPC ............ *G06F 3/044* (2013.01); *G06F 3/0412* (2013.01); *G06F 2203/04111* (2013.01)

(58) Field of Classification Search
CPC .................. G06F 3/044; G06F 3/0412; G06F 2203/04111

(Continued)

(56) References Cited

U.S. PATENT DOCUMENTS 8,471,446 B2   6/2013 Eom et al.
8,537,311 B2   9/2013 Fletcher et al.
(Continued)

FOREIGN PATENT DOCUMENTS

CN   1805630    7/2006
CN   101320107  12/2008
(Continued)

OTHER PUBLICATIONS

Ronald S. Cok, et al., "P-155: Ambient Contrast for OLED Displays," SID Symposium Digest of Technical Papers, vol. 38, Issue 1, May 2007, pp. 784-787.

(Continued)

*Primary Examiner* — Jonathan Boyd
(74) *Attorney, Agent, or Firm* — Jianq Chyun IP Office

(57) ABSTRACT

In one embodiment, a sensing apparatus having a first region with light transmittance less than a second region is provided. The sensing apparatus includes a first conductive layer, a color filter layer and a second conductive layer disposed on a substrate. The first conductive layer is located in the first region and includes first electrode patterns. The color filter layer covers the first conductive layer. The second conductive layer is disposed on the color filter layer and includes second electrode patterns. At least one of the second electrode patterns has a connection portion passing through the color filter layer to electrically connect to one of the first electrode patterns. The first electrode patterns and the second electrode patterns form first electrode series and second electrode series intersecting with the first electrode series. The connection portion is located at the intersection of one first electrode series and one second electrode series.

20 Claims, 22 Drawing Sheets

(58) Field of Classification Search
USPC .......................................................... 345/173
See application file for complete search history.

(56) References Cited

U.S. PATENT DOCUMENTS

| | | | |
|---|---|---|---|
| 8,550,667 | B2 | 10/2013 | Kim et al. |
| 8,743,466 | B2 | 6/2014 | Yamamoto |
| 8,917,252 | B2 | 12/2014 | Kuriki |
| 2010/0079870 | A1 | 4/2010 | Cao |
| 2011/0069039 | A1 | 3/2011 | Lee et al. |
| 2012/0086669 | A1 | 4/2012 | Kim et al. |
| 2012/0312677 | A1 | 12/2012 | Kuriki |
| 2012/0327020 | A1 | 12/2012 | Kohara et al. |
| 2013/0044384 | A1 | 2/2013 | Kim et al. |
| 2013/0113732 | A1 | 5/2013 | Kang et al. |
| 2013/0147742 | A1 | 6/2013 | Lee |
| 2013/0222282 | A1 | 8/2013 | Huang et al. |
| 2014/0022208 | A1 | 1/2014 | Wu |
| 2014/0183478 | A1* | 7/2014 | Lee .................. H01L 51/56 257/40 |
| 2014/0293160 | A1 | 10/2014 | Tang et al. |
| 2015/0049047 | A1* | 2/2015 | Liao .................. G06F 3/044 345/174 |
| 2015/0109542 | A1 | 4/2015 | Wu et al. |
| 2015/0212540 | A1* | 7/2015 | Tsujimoto ........... G02F 1/13338 345/174 |
| 2016/0018922 | A1* | 1/2016 | Wang ................ G06F 3/0412 345/174 |

FOREIGN PATENT DOCUMENTS

| | | |
|---|---|---|
| CN | 101943970 | 1/2011 |
| CN | 102566838 A | 7/2012 |
| CN | 102736287 | 10/2012 |
| CN | 103677410 | 3/2014 |
| CN | 103901650 A | 7/2014 |
| CN | 203759662 | 8/2014 |
| CN | 104423691 | 3/2015 |
| TW | 200620078 | 6/2006 |
| TW | 201124999 | 7/2011 |
| TW | 201211624 | 3/2012 |
| TW | I393924 | 4/2013 |
| TW | 201321774 A | 6/2013 |
| TW | 201329833 A | 7/2013 |
| TW | I401498 | 7/2013 |
| TW | M472252 | 2/2014 |
| TW | 201418177 | 5/2014 |
| TW | 201423511 | 6/2014 |
| TW | I441053 | 6/2014 |
| TW | M481453 | 7/2014 |
| TW | M484741 | 8/2014 |
| TW | 201441907 | 11/2014 |
| TW | 201445377 A | 12/2014 |
| TW | M494960 | 2/2015 |
| TW | M497344 | 3/2015 |

OTHER PUBLICATIONS

Zhenyue Luo, et al., "Emerging Quantum-Dots-Enhanced LCDs," Journal of Display Technology, vol. 10, No. 7, Jul. 2014, pp. 526-539.
Bo-Ru Yang, et al., "Emi-Flective Display Device with Attribute of High Glare-Free-Ambient-Contrast-Ratio," Japanese Journal of Applied Physics, vol. 46, No. 11, Nov. 2007, pp. 7418-7420.
Jiun-Haw Lee, et al., "High ambient-contrast-ratio display using tandem reflective liquid crystal display and organic light-emitting device," Optics Express, vol. 13, No. 23, Nov. 14, 2005, pp. 9431-9438.
Ranbir Singh, et al., "Improving the contrast ratio of OLED displays: An analysis of various techniques," Optical Materials, vol. 34, Issue 4, Feb. 2012, pp. 716-723.
Hyunseung Kim, et al., "The Advantage on Ambient Contrast Ratio in WRGB OLED Display," SID Symposium Digest of Technical Papers, vol. 44, Issue 1, Jun. 2013, pp. 1464-1465.
Ya-Ting Gao, et al., "Optical Film and Display Assembly Applying the Same," Unpublished U.S. Appl. No. 14/576,221, filed Dec. 19, 2014, The specification, claims, and the drawings of the unpublished pending U.S. application have been stored in the Image File Wrapper (IFW) system.
Yi-Shou Tsai, et al., "Optical Film With Touch Function," Unpublished U.S. Appl. No. 14/985,370, filed Dec. 30, 2015, The specification, claims, and the drawings of the unpublished pending U.S. application have been stored in the Image File Wrapper (IFW) system.
Ying-Ting Liou, et al., "Sensing Device," Unpublished U.S. Appl. No. 15/135,560, filed Apr. 22, 2016, The specification, claims, and the drawings of the unpublished pending U.S. application have been stored in the Image File Wrapper (IFW) system.
"Office Action of Taiwan Counterpart Application", issued on Aug. 23, 2016, p. 1-p. 9, in which the listed references were cited.
"Office Action of Taiwan Related Application, application No. 104136458", issued on Sep. 6, 2016, p. 1-p. 4, in which the listed references were cited.
"Office Action of Taiwan Related Application,application No. 105100175", issued on Oct. 14, 2016, p. 1-p. 8, in which the listed references were cited.

* cited by examiner

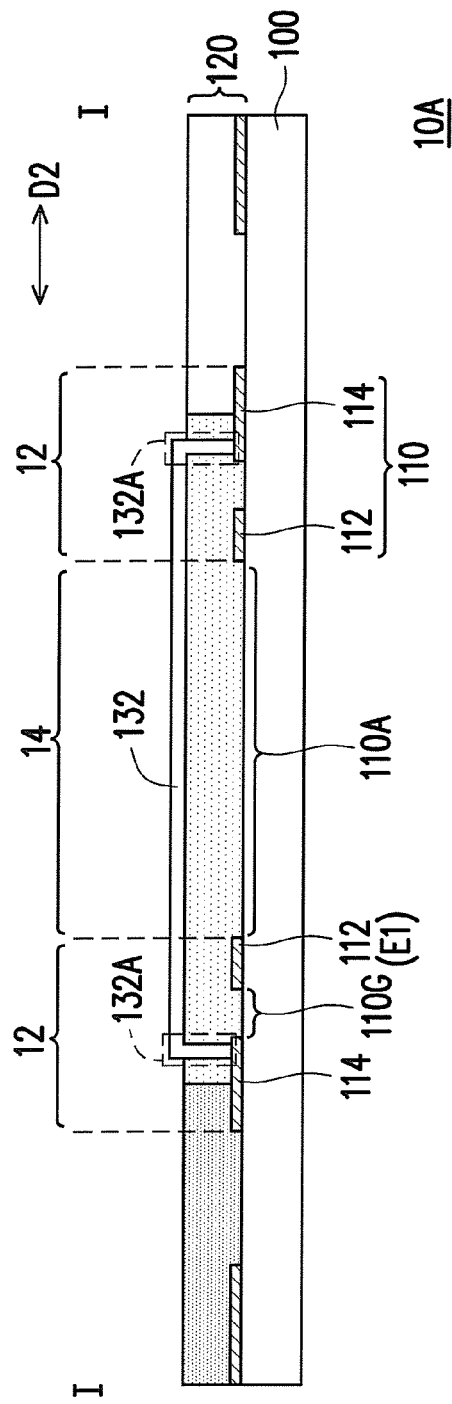
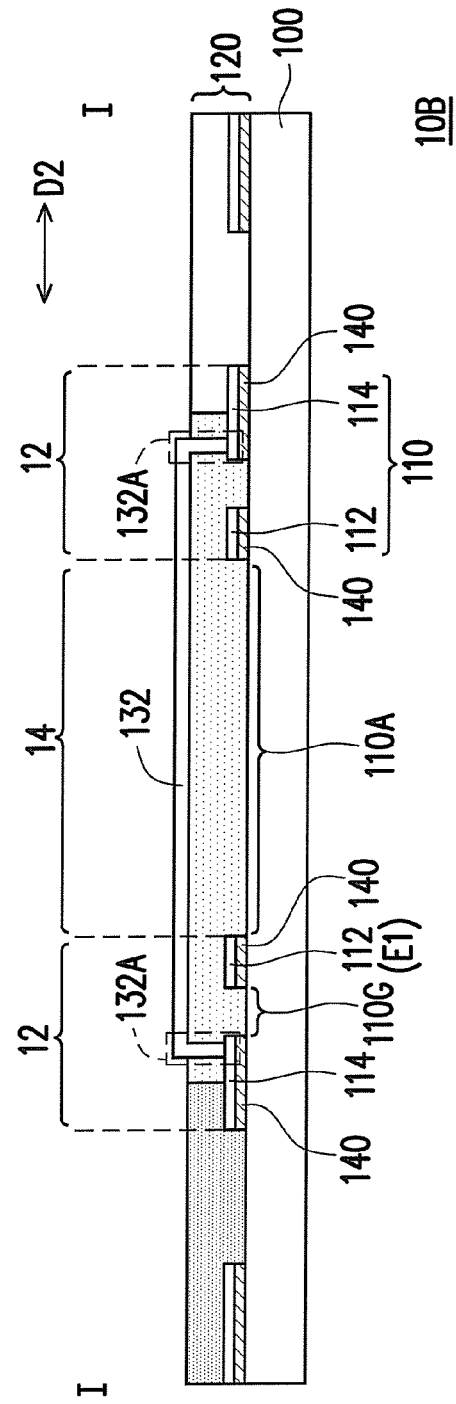
FIG. 3A
FIG. 3B

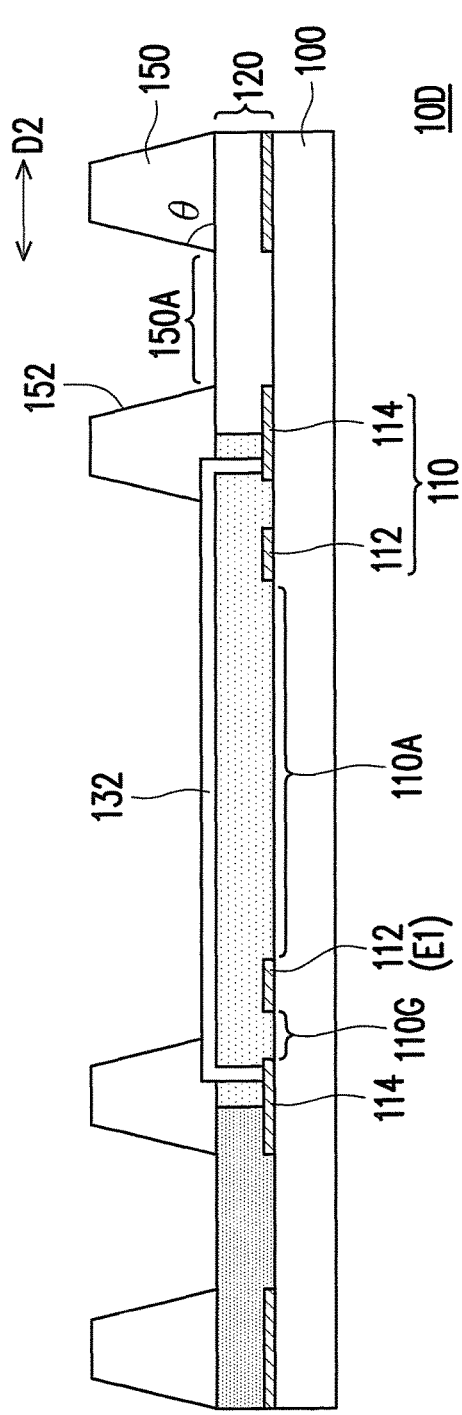
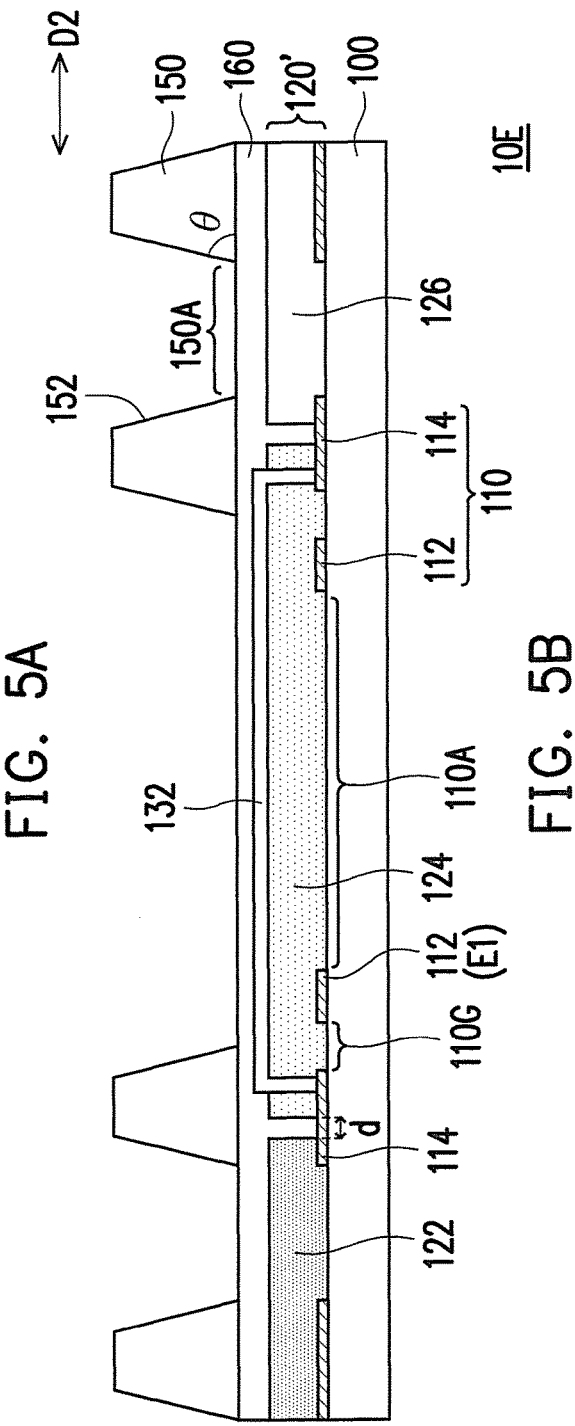
FIG. 5A
FIG. 5B

SENSING APPARATUS

CROSS-REFERENCE TO RELATED APPLICATION

This application claims the priority benefits of U.S. provisional application Ser. No. 62/150,859, filed on Apr. 22, 2015 and Taiwan application serial no. 104137117, filed on Nov. 11, 2015. The entirety of each of the above-mentioned patent applications is hereby incorporated by reference herein and made a part of this specification.

TECHNICAL FIELD

The disclosure relates to a sensing apparatus.

BACKGROUND

As information technology, mobile communication and information products have been rapidly developed and applied, to achieve more convenient, more compact and lighter, and more user-friendly designs, various information products have changed from using conventional input apparatuses such as keyboards or mice to using sensing apparatuses, such as touch panels.

Based on different sensing techniques employed, the sensing apparatuses may be divided into apparatuses using resistive touch sensing techniques, capacitive touch sensing techniques, optical touch sensing techniques, acoustic-wave touch sensing techniques, and electromagnetic touch sensing techniques. The capacitive touch sensing techniques are having a short response time, favorable reliability, and high definition, etc., and may be broadly applied in various handheld electronic apparatuses. When the user's finger touches or approaches the sensing apparatus, the sensing apparatus may determine a position that the user's finger touches or approaches based on a capacitance change on a sensing array. When the sensing apparatus is integrated into a display, the sensing apparatus may be disposed in front of the display for the user to operate in correspondence with the frames. The sensing apparatus may affect the frame displayed by the display. A visual effect of the display frame is an issue to work on when the sensing apparatus is integrated into a display.

SUMMARY

The sensing apparatus according to an embodiment of the disclosure has a first region and a second region. A light transmittance of the first region is lower than a light transmittance of the second region. The sensing apparatus includes a substrate, a first conductive layer, a color filter layer, and a second conductive layer. The first conductive layer is disposed on the substrate and located in the first region. In addition, the first conductive layer includes a plurality of first electrode patterns. The color filter layer is disposed on the substrate and covers the first conductive layer. The second conductive layer is disposed on the color filter layer and includes a plurality of second electrode patterns. At least one of the second electrode patterns has a connection portion, and the connection portion passes through the color filter layer and is electrically connected with one of the first electrode patterns. The first electrode patterns and the second electrode patterns form a plurality of first electrode series and a plurality of second electrode series. The first electrode series and the second electrode series intersect each other, and the connection portion is located at an intersection of one first electrode series and one second electrode series.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 3A is a schematic cross-sectional view illustrating a first embodiment of a partial region of the sensing apparatus shown in FIG. 1B taken along line I-I.

FIG. 3B is a schematic cross-sectional view illustrating a second embodiment of a partial region of the sensing apparatus shown in FIG. 1B taken along line I-I.

FIG. 5A is a schematic cross-sectional view illustrating a sensing apparatus according to another embodiment of the disclosure.

FIG. 5B is a schematic cross-sectional view illustrating a sensing apparatus according to yet another embodiment of the disclosure.

DETAILED DESCRIPTION OF DISCLOSED EMBODIMENTS

Figure 1A:
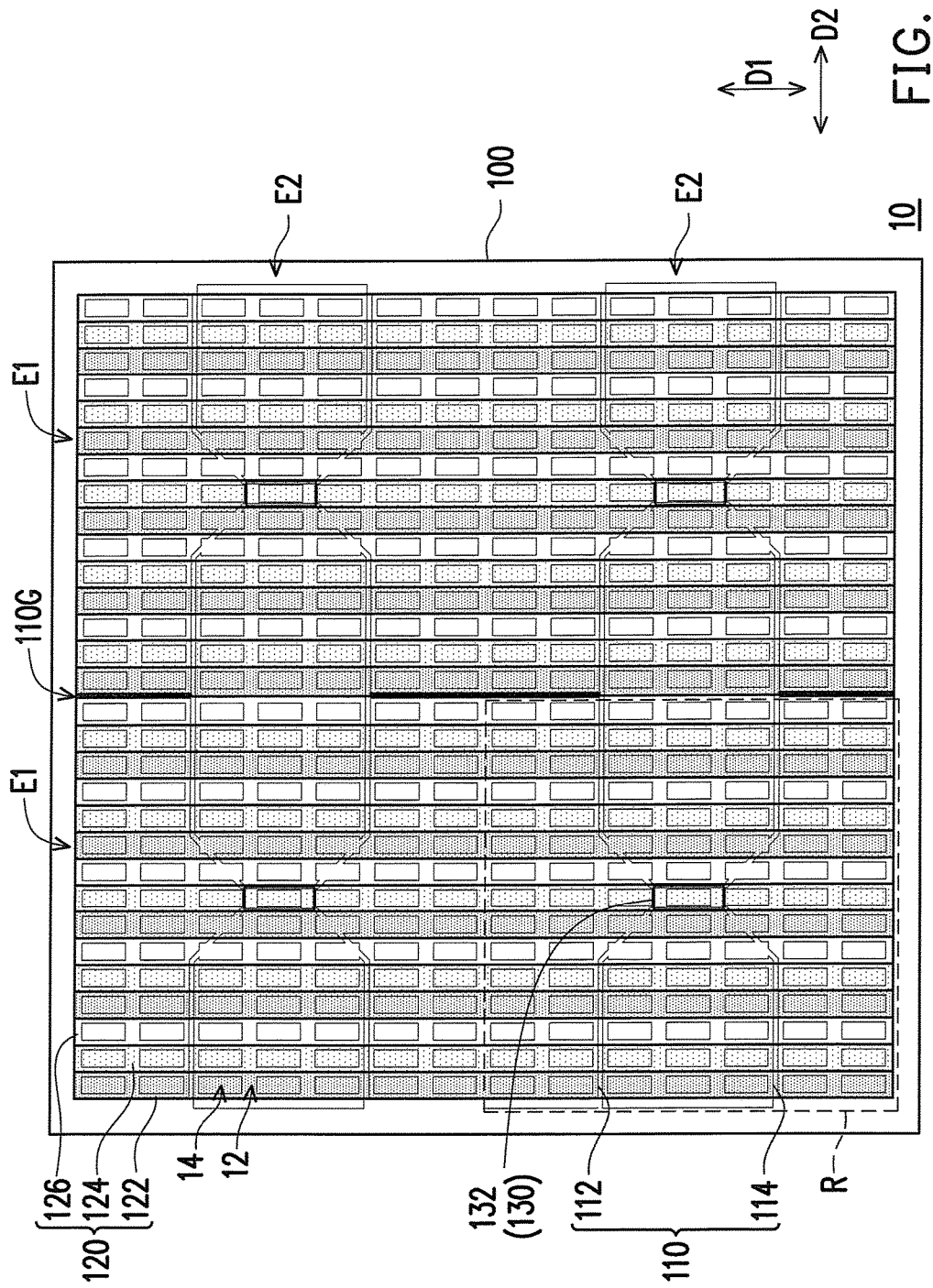
FIG. 1A is a schematic top view illustrating a sensing apparatus according to an embodiment of the disclosure.
Figure 1B:
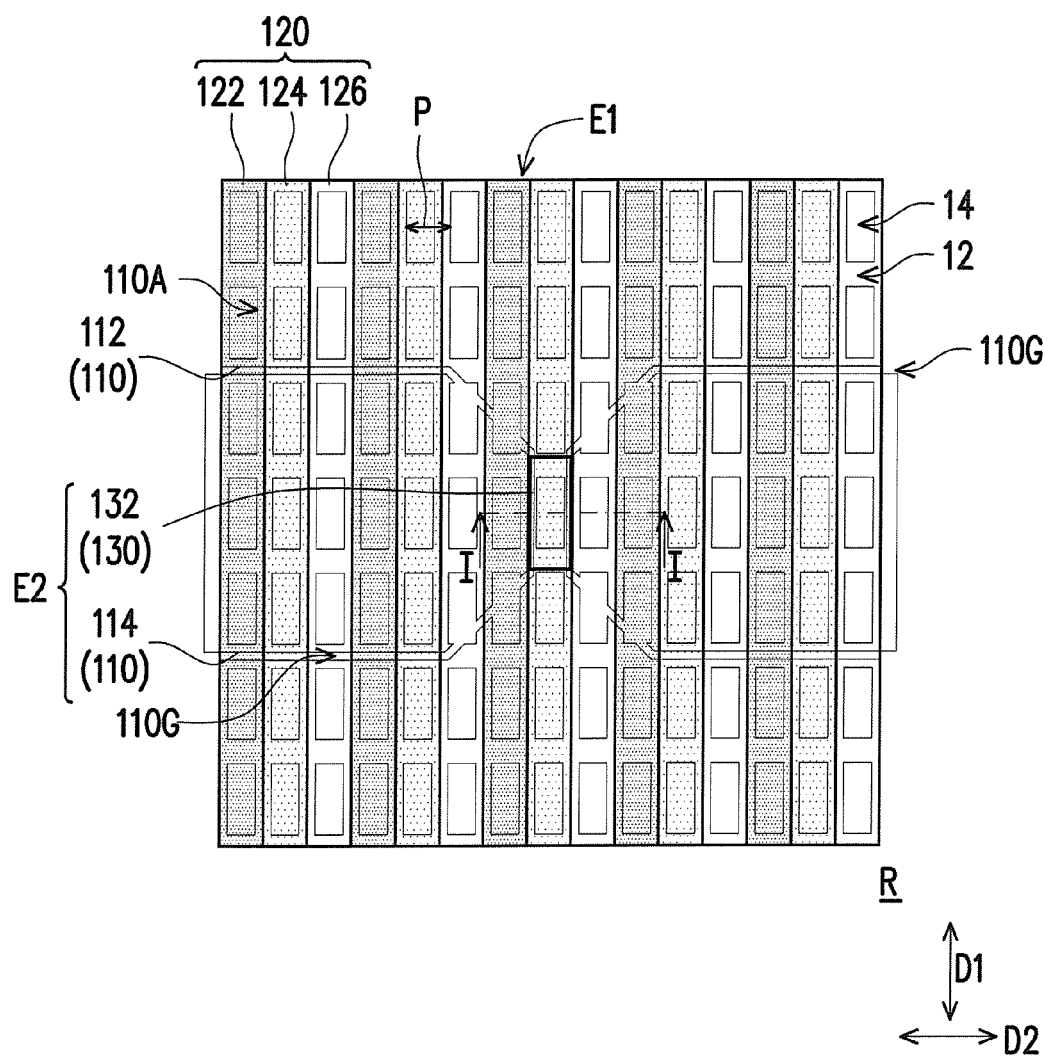
FIG. 1B is a schematic enlarged view illustrating a partial region R in the sensing apparatus shown in FIG. 1A.

FIG. 1A is a schematic top view illustrating a sensing apparatus according to an embodiment of the disclosure, and FIG. 1B is a schematic enlarged view illustrating a partial region R in the sensing apparatus shown in FIG. 1A. In FIGS. 1A and 1B, a sensing apparatus 10 includes a substrate 100 and a first conductive layer 110, a color filter layer 120, and a second conductive layer 130 disposed on the substrate 100. More specifically, to clearly show the design of profiles of the respective layers in the top view, FIGS. 2A to 2C respectively illustrate partial schematic top views of the first conductive layer 110, the color filter layer 120, and the second conductive layer 130.

Figure 2A:
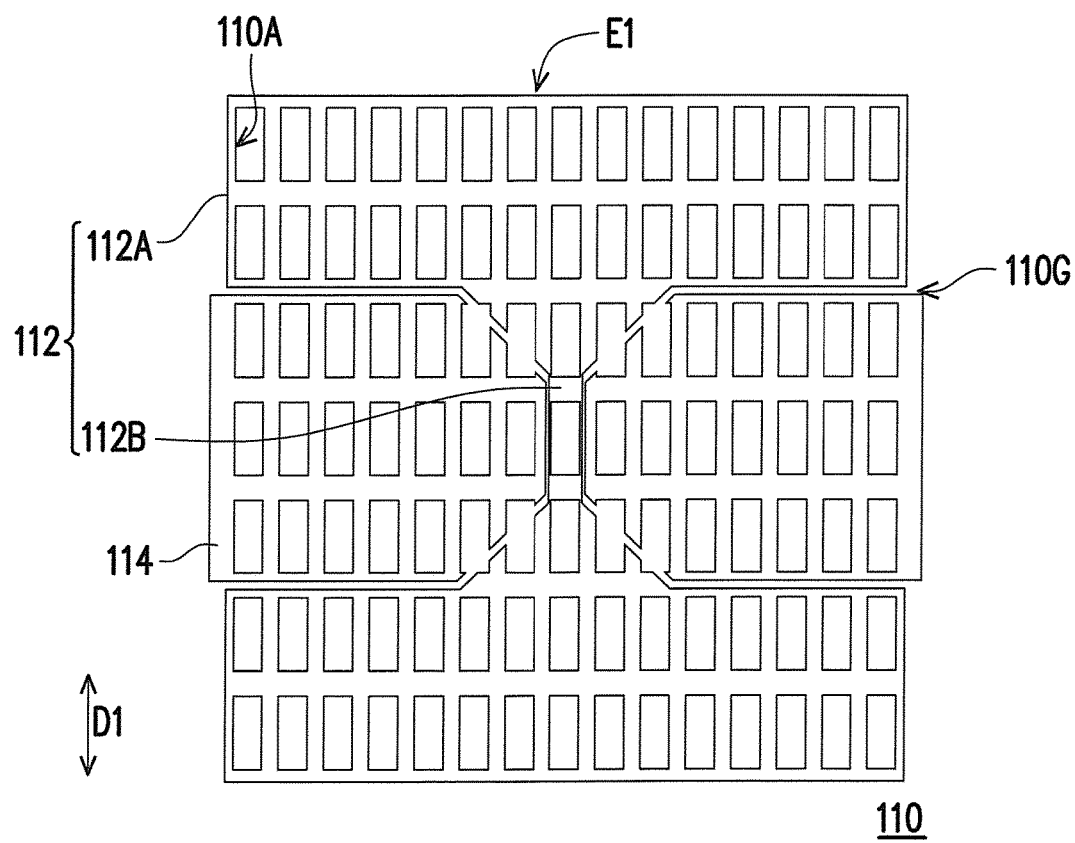
FIG. 2A is a partial schematic top view illustrating a first conductive layer in the sensing apparatus shown in FIG. 1A.

Referring to FIGS. 1A, 1B, and 2A at the same time, the first conductive layer 110 in this embodiment includes a plurality of first electrode patterns 112 and a plurality of first electrode patterns 114. A profile of each of the first electrode patterns 112 or 114 may be defined by a gap 110G. In other words, the gaps 110G may divide the first conductive layer 110 into a plurality of patterns that are independent from each other as the first electrode patterns 112 and 114. At least one of the first electrode patterns 112 includes a plurality of wide parts 112A and a plurality of narrow parts 112B. Each of the narrow parts 112B connects two wide parts 112A to connect the wide parts 112A in series along a first direction D1, so as to form a first electrode series E1. In this embodiment, each of the first electrode patterns 112 is a first electrode series E1, and the first electrode series E1 in the sensing apparatus 10 may be separated from each other by the gaps 110G. When a second direction D2 is defined as a direction intersecting the first direction D1, the narrow part 112B of the first electrode pattern 112 is located between two first electrode patterns 114 adjacent in the second direction D2.

The sensing apparatus 10 includes a plurality of openings 110A arranged along the first direction D1 and the second direction D2 to form an array, and a light transmittance in an area where the first conductive layer 110 is located is lower than a light transmittance of an area where the openings 110A are located. Thus, in the sensing apparatus 10, a first region 12 is defined as an area excluding the openings 110A, and a second region 14 is defined as the area where the openings 110A are located. In other words, the light transmittance of the first region 12 is lower than the light transmittance of the second region 14 in this embodiment, such that the openings 110A arranged as an array may allow light to pass through, and the area where the first conductive layer 110 is located is adapted to block the light.

Figure 2B:
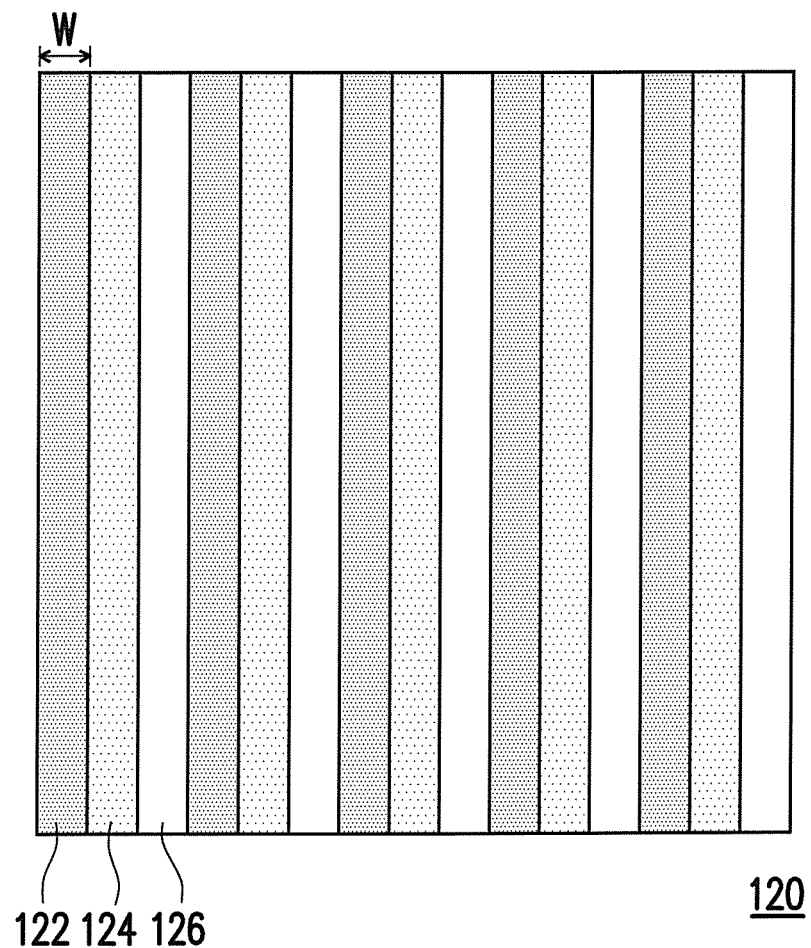
FIG. 2B is a partial schematic top view illustrating a color filter layer in the sensing apparatus shown in FIG. 1A.

As shown in FIGS. 1A, 1B, and 2B, the color filter layer 120 in this embodiment may include a plurality of color filter patterns 122, 124, and 126, for example. In this embodiment, the color filter patterns are marked with the different reference symbols 122, 124, and 126 to indicate that the color filter patterns may have different colors. For example, the color filter patterns 122, 124, and 126 may respectively be a red color filter pattern, a green color filter pattern, and a blue color filter pattern. However, in other embodiments, the color filter layer 120 is not limited to the color filter patterns in three colors.

An interface between two adjacent color filter patterns of the color filter patterns 122, 124, and 126 may be located in the first region 12. Thus, a mutual interference of colors or mura at the interface between two adjacent color filter patterns of the color filter patterns 122, 124, and 126 may be blocked by taking advantage of the lower light transmittance in the first region 12. Configuring the interface between two adjacent color filter patterns of the color filter patterns 122, 124, and 126 in the first region 12 helps provide a preferable color filtering effect. Also, taking the color filter pattern 122 as an example, a width W of single color filter pattern 122 is designed to cover one of the openings 110A of the first conductive layer 110. Thus, the width W of the single color filter pattern 122 is approximately equal to a pitch P of the opening 110A of the first conductive layer 110 in the second direction D2. However, the width W of one color filter pattern 122 is not limited thereto. In other embodiments, it may be designed that the coverage of the width W of single color filter pattern 122 does not exceed the opening 110A or that the width W of single color filter pattern 122 covers the openings 110A in more than one column.

Figure 2C:
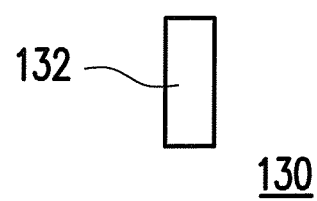
FIG. 2C is a partial schematic top view illustrating a second conductive layer in the sensing apparatus shown in FIG. 1A.

Referring to FIGS. 1A, 1B, and 2C, the second conductive layer 130 includes a plurality of second electrode patterns 132. The second electrode patterns 132 are independent from each other and disposed above one of the narrow parts 112B of one of the first electrode patterns 112. Each of the second electrode patterns 132 may cross one of the narrow parts 112B of one of the first electrode patterns 112 to connect two first electrode patterns 114 adjacent in the second direction D2 in series to form a second electrode series E2.

FIG. 3A is a schematic cross-sectional view illustrating a first embodiment of a partial region of the sensing apparatus shown in FIG. 1B taken along line I-I. Referring to FIGS. 1B and 3A, in this embodiment, a sensing apparatus 10A is illustrated in a cross-sectional view showing an embodiment of the sensing apparatus 10. The components in the sensing apparatus 10A may substantially have a profile design similar to that shown in FIGS. 1A and 1B. In the sensing apparatus 10A, at least one of the second electrode patterns 132 has a connection portion 132A connecting the first electrode pattern 114. In this embodiment, the connection portion 132A is provided at each of two ends of each of the second electrode patterns 132, and the connection portion 132A passes through the color filter layer 120 and is electrically connected to one of the first electrode patterns 114. In this way, each of the second electrode patterns 132 may physically and electrically connect the adjacent first electrode patterns 114 in the second direction D2 in series to form the second electrode series E2.

As shown in FIG. 3A, the gaps 110G may separate the first electrode patterns 112 that form the first electrode series E1 and the first electrode patterns 114 that form the second electrode series E2. Referring to FIGS. 1A and 1B, the connection between the first conductive layer 110 and the second conductive layer 130 construct the first electrode series E1 and the second electrode series E2. The first electrode series E1 intersect the second electrode series E2, and the first electrode series E1 are not conductive with respect to the second electrode series E2, so as to implement mutual capacitance touch sensing. In other words, when the sensing apparatus 10 or the sensing apparatus 10A performs touch sensing operation, one of the first electrode series E1 and the second electrode series E2 may serve as a scan electrode, while the other may serve as a read electrode. Also, when the user's hand or a touch medium (e.g., a touch pen) contacts or approaches the sensing apparatus 10 or the sensing apparatus 10A, a capacitance change read by the read electrode may be used to estimate a touch position, so as to implement touch sensing.

The first conductive layer 110 in this embodiment may be a light shielding conductive layer and have a low reflectivity. Thus, the area where the first conductive layer 110 is located defines the first region 12 having a lower light transmittance, and the area where the openings 110A are located may be considered as the second region 14 having a higher light transmittance. A light shielding conductive material for manufacturing the first conductive layer 110 may include a metal or a metal alloy, such as chromium, silver, aluminum, gold, copper, iron, and titanium. The second conductive layer 130 may be manufactured by using a transparent conductive material to provide a light transmittance (e.g., a light transmittance higher than that of the first conductive layer 110). The transparent conductive material may include indium tin oxide (ITO), indium zinc oxide (IZO), indium gallium zinc oxide (IGZO), indium oxide, zinc oxide, tin oxide, nano-silver wire, PEDOT:PSS, carbon nanotube, etc., for example.

A material of the color filter layer 120 may include colored resin or ink, etc. The color filter layer 120 is electrically insulating, and may be sandwiched between the first conductive layer 110 and the second conductive layer 130, so as to prevent the first electrode pattern 112 of the first conductive layer 110 and the second electrode pattern 132 of the second conductive layer 130 from being electrically connected with each other, thereby implementing mutual capacitance sensing. In other words, this embodiment is designed to use the color filter layer 120 having a color filtering effect as an insulating layer between the first conductive layer 110 and the second conductive layer 130. Thus, the sensing apparatus 10 is not only capable of performing touch sensing, but also capable of filtering colors without additionally adding another layer.

Figure 3C:
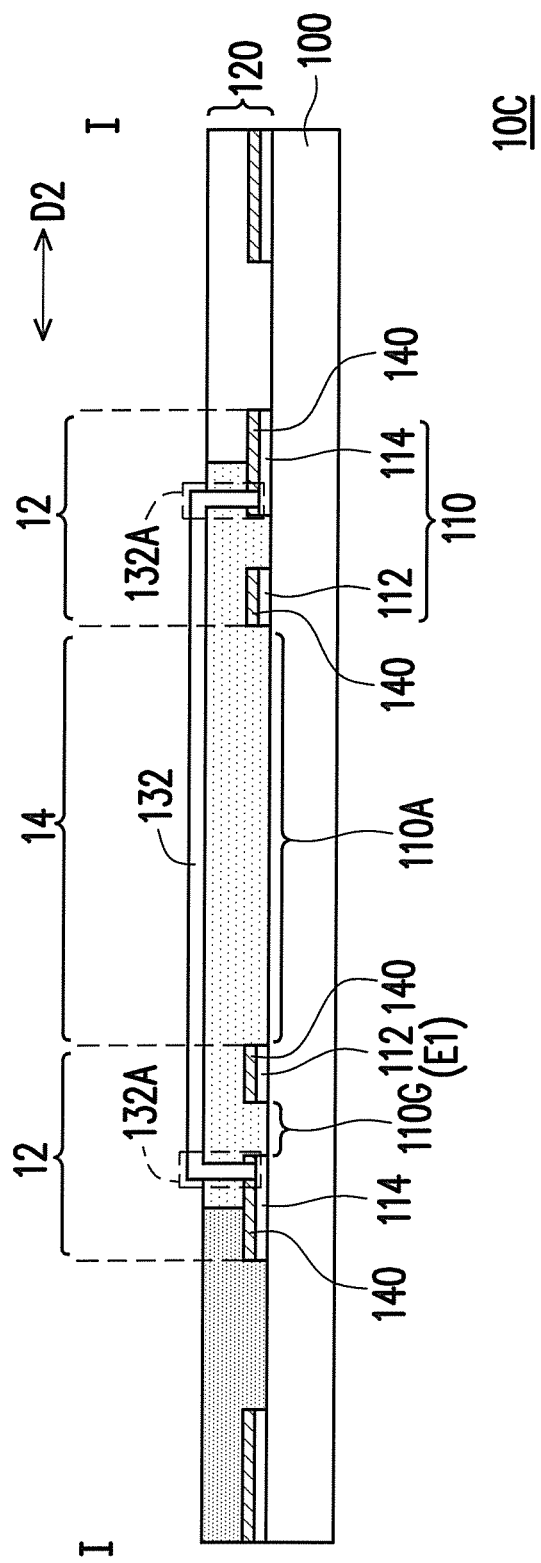
FIG. 3C is a schematic cross-sectional view illustrating a third embodiment of a partial region of the sensing apparatus shown in FIG. 1B taken along line I-I.

The first region 12 in FIG. 3A has a lower light transmittance, and the first conductive layer 110 may be manufactured by using a light shielding conductive material. However, the disclosure is not limited thereto. For example, FIGS. 3B and 3C are schematic cross-sectional views illustrating a second embodiment and a third embodiment of a partial region of the sensing apparatus shown in FIG. 1B taken along line I-I. Referring to FIG. 3B, the sensing apparatus 10 is illustrated as a sensing apparatus 10B in the embodiment shown in FIG. 3B, and the sensing apparatus 10 is illustrated as a sensing apparatus 10C in the embodiment shown in FIG. 3C. The sensing apparatuses 10B and 10C may be similar to the design shown in FIG. 3A. In the embodiments shown in FIGS. 3B and 3C, a light shielding layer 140 is further disposed between the color filter layer 120 and the substrate 100, and the first conductive layer 110 is distributed in accordance with the light shielding layer 140. In this way, areas where the light shielding layer 140 and the corresponding first conductive layer 110 are distributed define the first region 12 shown in FIGS. 1A and 1B. A material of the light shielding layer 140 includes a light shielding resin material or other light shielding materials. In FIG. 3B, the light shielding layer 140 is disposed between the first conductive layer 110 and the substrate 100, while in FIG. 3C, the first conductive layer 110 is disposed between the light shielding layer 140 and the substrate 100. In the designs shown in FIGS. 3B and 3C, the material of the first conductive layer 110 is not limited to be a light shielding conductive material, and may include a transparent conductive material. The transparent conductive material may include indium tin oxide (ITO), indium zinc oxide (IZO), indium gallium zinc oxide (IGZO), indium oxide, zinc oxide, tin oxide, nano-silver wire, PEDOT:PSS, carbon nanotube, etc., for example.

Figure 4:
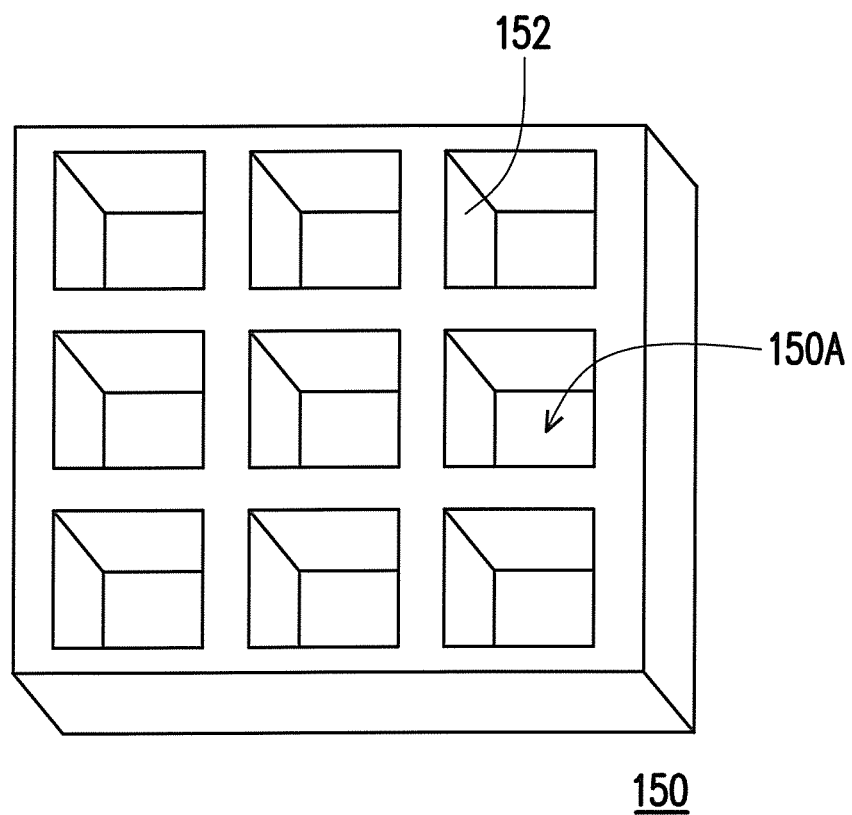
FIG. 4 is a partial schematic view illustrating a light guide structure according to an embodiment of the disclosure.

FIG. 4 is a partial schematic view illustrating a light guide structure according to an embodiment of the disclosure. In FIG. 4, a light guide structure 150 includes a plurality of light guide openings 150A, and an inclined sidewall 152 is provided at least one of the light guide openings 150A in the light guide structure 150. The light guide structure 150 may be disposed in any of the sensing apparatuses 10A to 10C to guide light. FIG. 5A is a schematic cross-sectional view illustrating a sensing apparatus according to another embodiment of the disclosure. Referring to FIG. 5A, a sensing apparatus 10D may include components shown in FIG. 3A, and further include the light guide structure 150 shown in FIG. 4. A top view of the sensing apparatus 10D may have the structural designs shown in FIGS. 1A and 1B, while the sensing apparatus 10D includes the first conductive layer 110, the color filter layer 120, and the second conductive layer 130 disposed on the substrate 100. The structural design of the first conductive layer 110, the color filter layer 120, and the second conductive layer 130 may be referred to FIGS. 1A, 1B, 2A to 2C, and 3A, and will thus not be repeated in the following. The sensing apparatus 10D may optionally include the light shielding layer 140 as shown in FIGS. 3B and 3C.

The light guide structure 150 may be disposed on the color filter layer 120 and include the light guide openings 150A. In addition, the light guide openings 150A are arranged as an array to expose the second region 14 defined by the first conductive layer 110. In other words, an area where the light guide structure 150 is located is substantially in the first region 12 and the light guide structure 150 exposes the second region 14 to allow light to pass through the second region 14. Moreover, in an embodiment, since the inclined sidewall 152 is provided at each of the light guide openings 150A of the light guide structure 150, an area of each of the light guide openings 150A gradually increases from one end close to the substrate 100 along a direction away from the substrate 100. In other words, an included angle θ between the inclined sidewall 152 and a top surface of the color filter layer 120 is less than 90 degrees, such as 85 degrees.

FIG. 5B is a schematic cross-sectional view illustrating a sensing apparatus according to yet another embodiment of the disclosure. Referring to FIG. 5B, a sensing apparatus 10E includes the first conductive layer 110, a color filter layer 120', the second conductive layer 130, and the light guide structure 150. In addition, the first conductive layer 110, the second conductive layer 130, and the light guide structure 150 may be similar to those in the embodiment shown in FIG. 5A. The color filter layer 120' is similar to the color filter layer 120, a distance d is kept between the color filter patterns 122 and 124 in the color filter layers 120'. Also, the sensing apparatus 10E further includes an isolation layer 160. The isolation layer 160 is disposed between the color filter layer 120 and the light guide structure 150 and may provide a surface to dispose the light guide structure 150. The sensing apparatus 10E may optionally include the light shielding layer 140 as shown in FIGS. 3B and 3C. In other words, the first conductive layer 110 is not required to be manufactured by using a light shielding conductive material.

Figure 6:
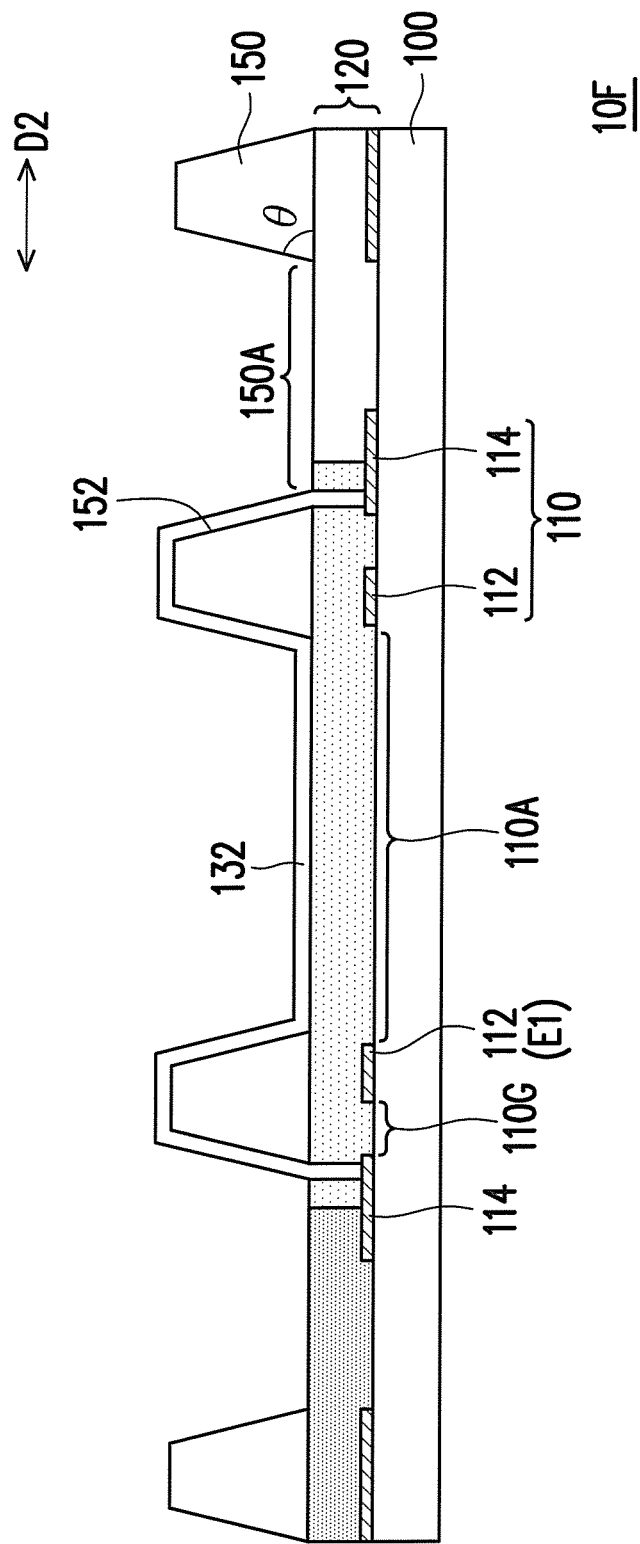
FIG. 6 is a schematic cross-sectional view illustrating a sensing apparatus according to still another embodiment of the disclosure.

FIG. 6 is a schematic cross-sectional view illustrating a sensing apparatus according to still another embodiment of the disclosure. Referring to FIG. 6, a sensing apparatus 10F is similar to the sensing apparatus 10D shown in FIG. 5A and may include the components shown in FIG. 3A and further include the light guide structure 150 shown in FIG. 4. The second electrode pattern 132 of the sensing apparatus 10F may cover the light guide structure 150, and the light guide structure 150 is located between the second electrode pattern 132 and the color filter layer 120. The design of the light guide structure 150 described herein may be similar to the light guide structure 150 above, and the light guide structure 150 is provided with the inclined sidewall 152 to guide light.

Figure 7:
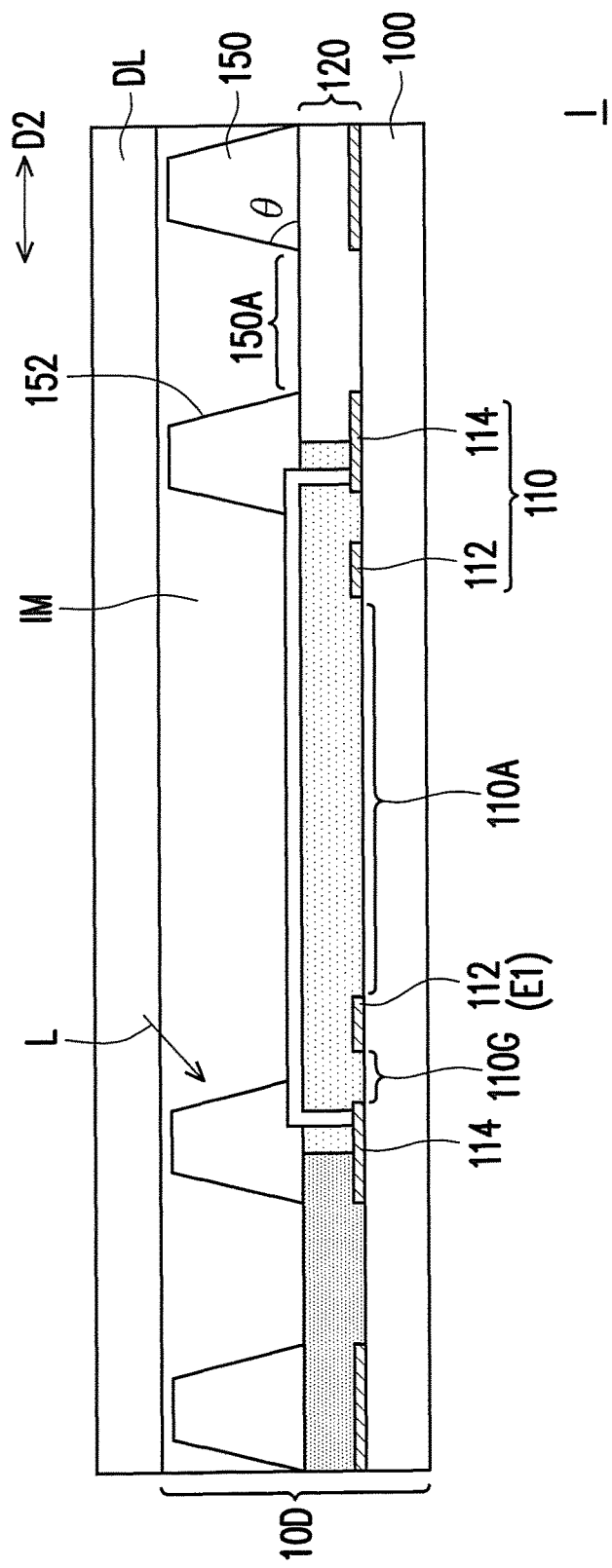
FIG. 7 is a schematic view illustrating a sensing apparatus being applied in a display according to an embodiment of the disclosure.

FIG. 7 is a schematic view illustrating a sensing apparatus being applied in a display according to an embodiment of the disclosure. Referring to FIG. 7, in this embodiment, the sensing apparatus 10D shown in FIG. 5A is combined with a display layer DL to form a display 1, for example. In other embodiments, any of the sensing apparatuses 10A to 10C and 10E may be combined with the display layer DL to form a display. Also, the display layer DL may be a self-illuminating display layer, such as an organic light-emitting layer, etc., or a non-self-illuminating display layer, such as a liquid crystal layer, an electro-phoretic display layer, an electro-wetting layer, etc. The display 1 may include the sensing apparatus 10D, a capping layer IM, and the display layer DL. The capping layer IM covers the light guide structure 150 on the sensing apparatus 10D, and fills into the light guide opening 150A. The display layer DL is disposed on the capping layer IM. A refractive index of the capping layer IM is greater than a refractive index of the light guide structure 150, and a difference between the refractive index of the capping layer IM and the refractive index of the light guide structure 150 may be greater than or equal to 0.3, for example. In an embodiment, the refractive index of the capping layer IM may be in a range from 1.3 to 2, and the refractive index of the light guide structure 150 may be in a range from 1 to 1.7. A light beam L emitted by the display layer DL may be guided by the inclined sidewall 152 to be emitted out of the display 1 through the opening 110A of the first conductive layer 110. Display light beams emitted by the display layer DL may be collectively emitted out of the display 1 at the second region 14 where the openings 110A are located, so as to increase a display brightness of the display 1. Even when the display 1 is used in a brighter environment, the viewer may see a clear frame displayed by the display 1. Also, since the sensing apparatus 10D has the color filter layer 120, the sensing apparatus 10D may provide a colored display effect for the display 1 or improve color saturation of the display frame.

Figure 8:
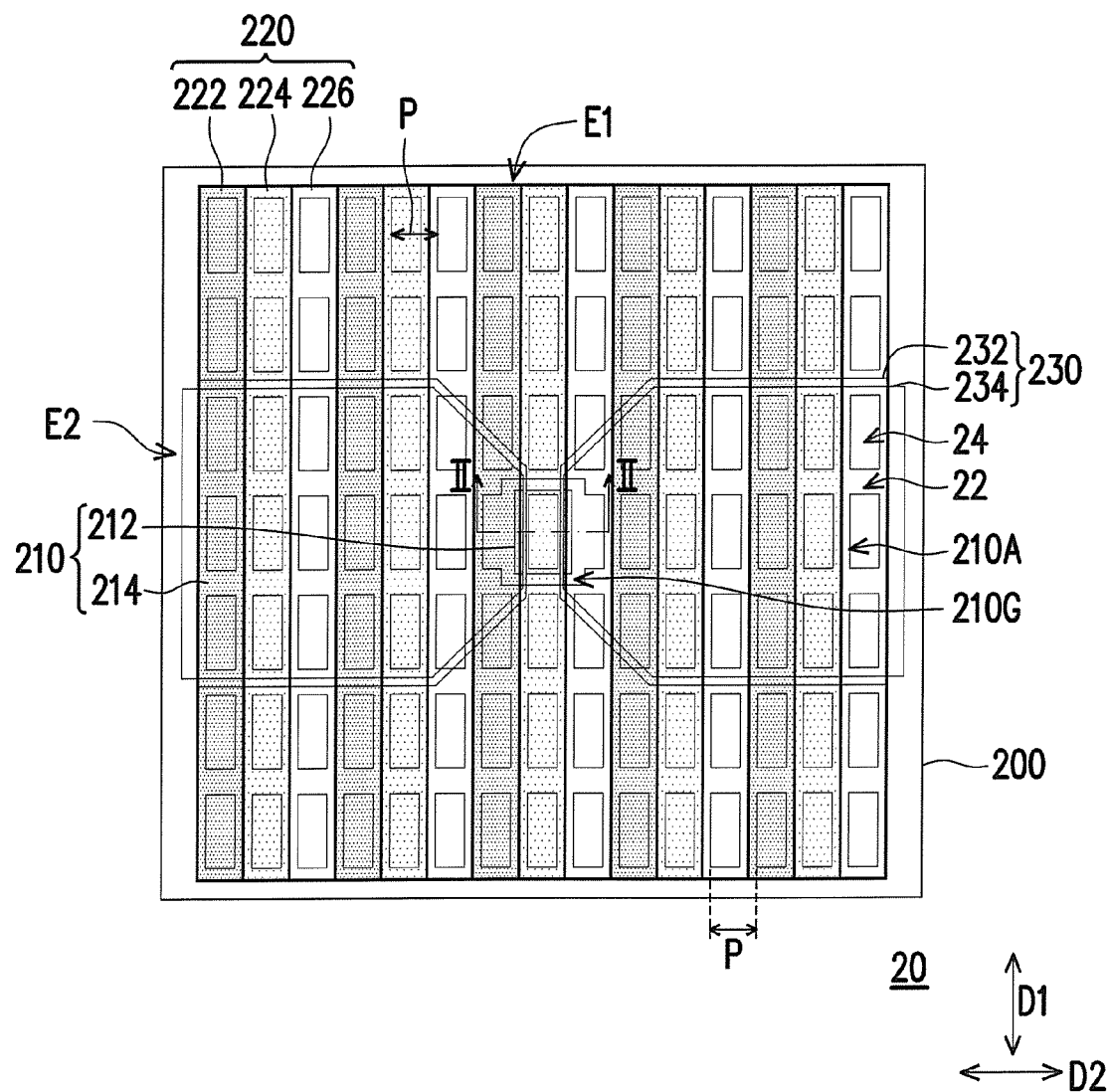
FIG. 8 is a partial top view illustrating a sensing apparatus according to another embodiment of the disclosure.

FIG. 8 is a partial top view illustrating a sensing apparatus according to another embodiment of the disclosure. Referring to FIG. 8, a sensing apparatus 20 includes a substrate 200 and a first conductive layer 210, a color filter layer 220, and a second conductive layer 230 disposed on the substrate 200. To clearly show the design of profiles of the respective layers in the top view, FIGS. 9A to 9C respectively illustrate partial schematic top views of the first conductive layer 210, the color filter layer 220, and the second conductive layer 230.

Figure 9A:
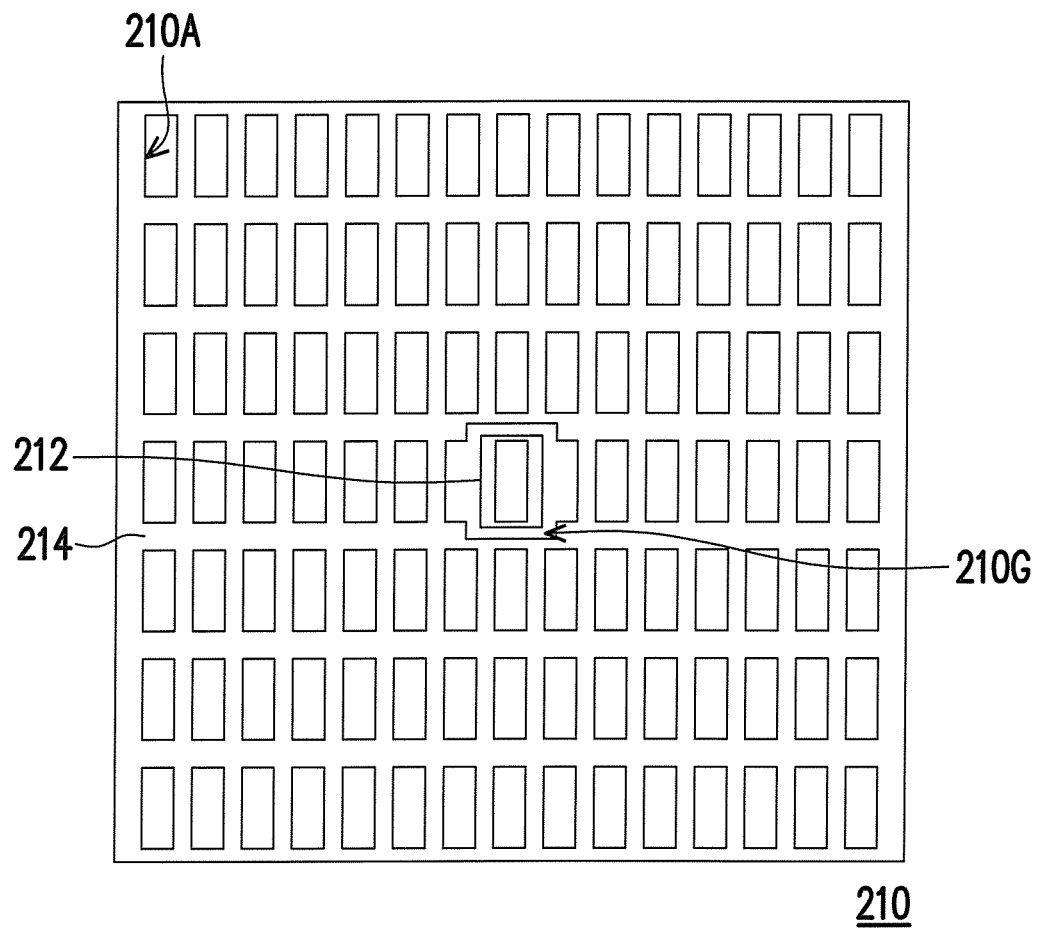
FIGS. 9A to 9C are respectively partial schematic top views illustrating a first conductive layer, a color filter layer, and a second conductive layer.

Referring to FIGS. 8 and 9A at the same time, the first conductive layer 210 in this embodiment includes a plurality of first electrode patterns 212. In addition, a profile of each of the first electrode patterns 212 is defined by a gap 210G to be independent from other parts of the first conductive layer 210, such as a light shielding pattern 214. In this embodiment, the first conductive layer 210 may include a plurality of openings 210A. A light transmittance of an area where the first electrode patterns 212 are located is lower than a light transmittance of an area where the openings 210A are located. A first region 22 is defined as an area excluding the openings 210A, and a second region 24 is defined as the area where the openings 210A are located. In other words, the light transmittance of the first region 22 is lower than the light transmittance of the second region 24 in this embodiment, such that the openings 210A arranged in an array may allow light to pass through, and the area where the first electrode patterns 212 are located is adapted to block the light.

Figure 9B:
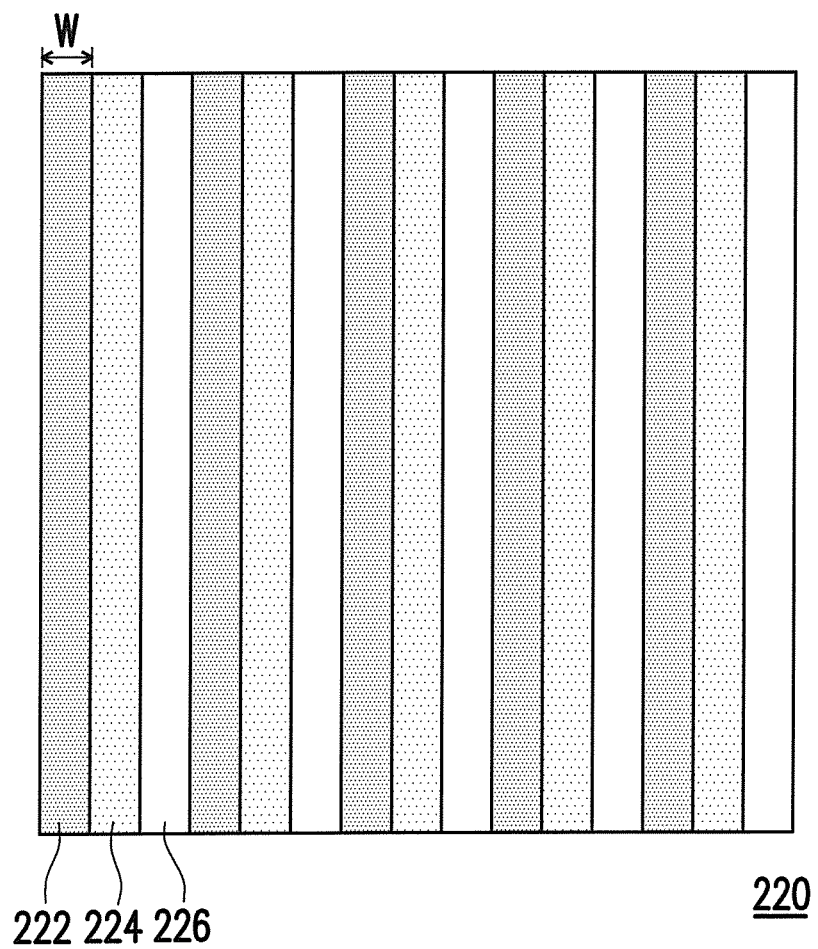

As shown in FIGS. 8 and 9B, the color filter layer 220 in this embodiment may include a plurality of color filter patterns 222, 224, and 226, for example. In this embodiment, the color filter patterns are marked with the different reference symbols 222, 224, and 226 to indicate that the color filter patterns may have different colors. For example, the color filter patterns 222, 224, and 226 may respectively be a red color filter pattern, a green color filter pattern, and a blue color filter pattern. However, in other embodiments, the color filter layer 120 is not limited to the filter patterns of three colors.

An interface between two adjacent color filter patterns of the color filter patterns 222, 224, and 226 may be located in the first region 22. A mutual interference of colors or that the color does not meet a predetermined requirement at the interface between two adjacent color filter patterns of the color filter patterns 222, 224, and 226 may be blocked by taking advantage of the lower light transmittance in the first region 22. Configuring the interface between two adjacent color filter patterns of the color filter patterns 222, 224, and 226 in the first region 22 may provide a preferable filtering effect. Also, taking the color filter pattern 222 as an example, a width W of one color filter pattern 222 is designed to cover single one of the openings 210A of the first conductive layer 210. The width W of one color filter pattern 222 is approximately equal to a pitch P of the opening 210A of the first conductive layer 210. However, the width W of one color filter pattern 222 is not limited thereto. In other embodiments, it may also be designed that the coverage of the width W of one color filter pattern 222 does not exceed the opening 210A or that the width W of one color filter pattern 122 covers the openings 210A in more than one column.

Figure 9C:
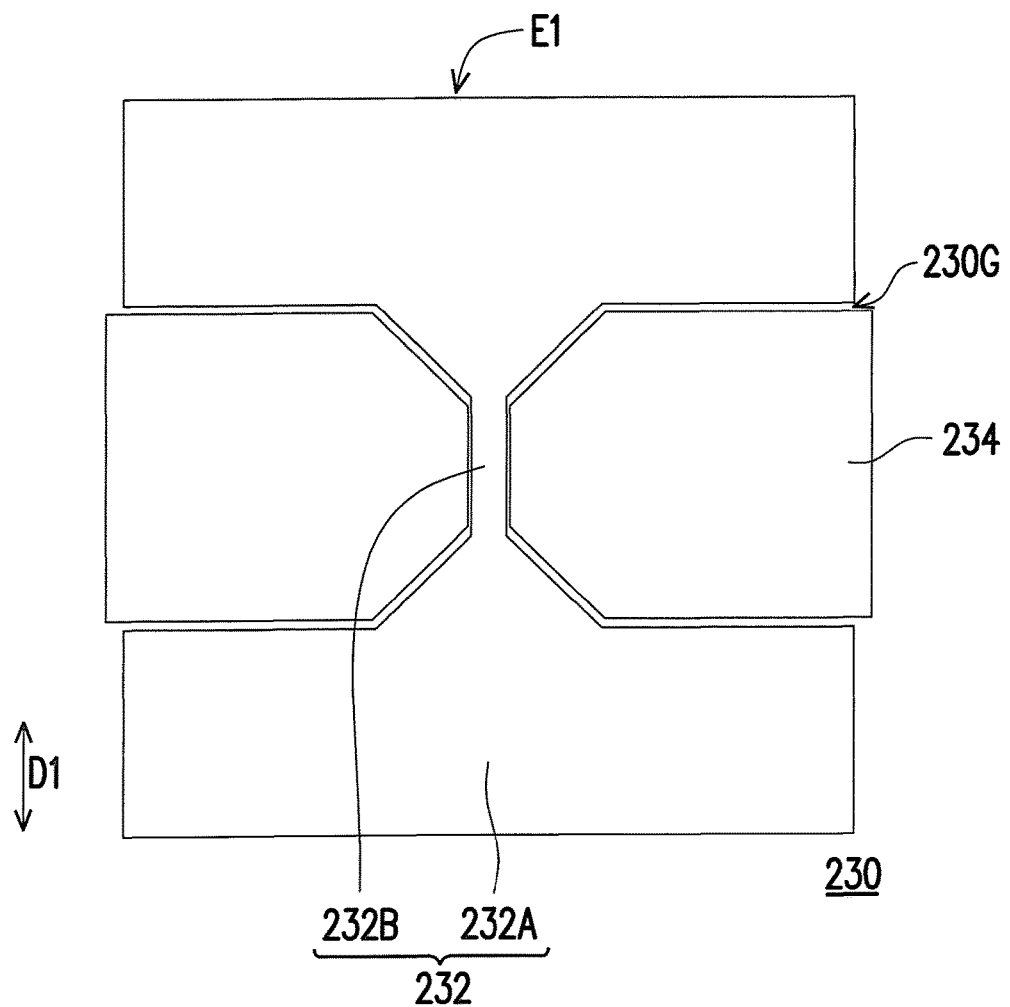

Referring to FIGS. 8 and 9C at the same time, the second conductive layer 230 in this embodiment includes a plurality of second electrode patterns 232 and 234 independent from each other. In addition, the second electrode patterns 232 and the second electrode patterns 234 are separated from each other by gaps 230G, so as to be independent from each other. At least one of the second electrode patterns 232 may include a plurality of wide parts 232A and a plurality of narrow parts 232B. Each of the narrow parts 232B connects two wide parts 232A to connect the wide parts 232A in series along a first direction D1, so as to form a first electrode series E1. In this embodiment, each of the second electrode patterns 232 is the first electrode series E1. When the second direction D2 is defined as a direction intersecting the first direction D1, the narrow part 232B of the second electrode pattern 232 is located between two second electrode patterns 234 adjacent in the second direction D2. Moreover, as shown in FIG. 8, each of the first electrode patterns 212 may cross one of the narrow parts 232B of one of the second electrode patterns 232 to connect two second electrode patterns 234 adjacent in the second direction D2 in series to form the second electrode series E2.

Figure 10A:
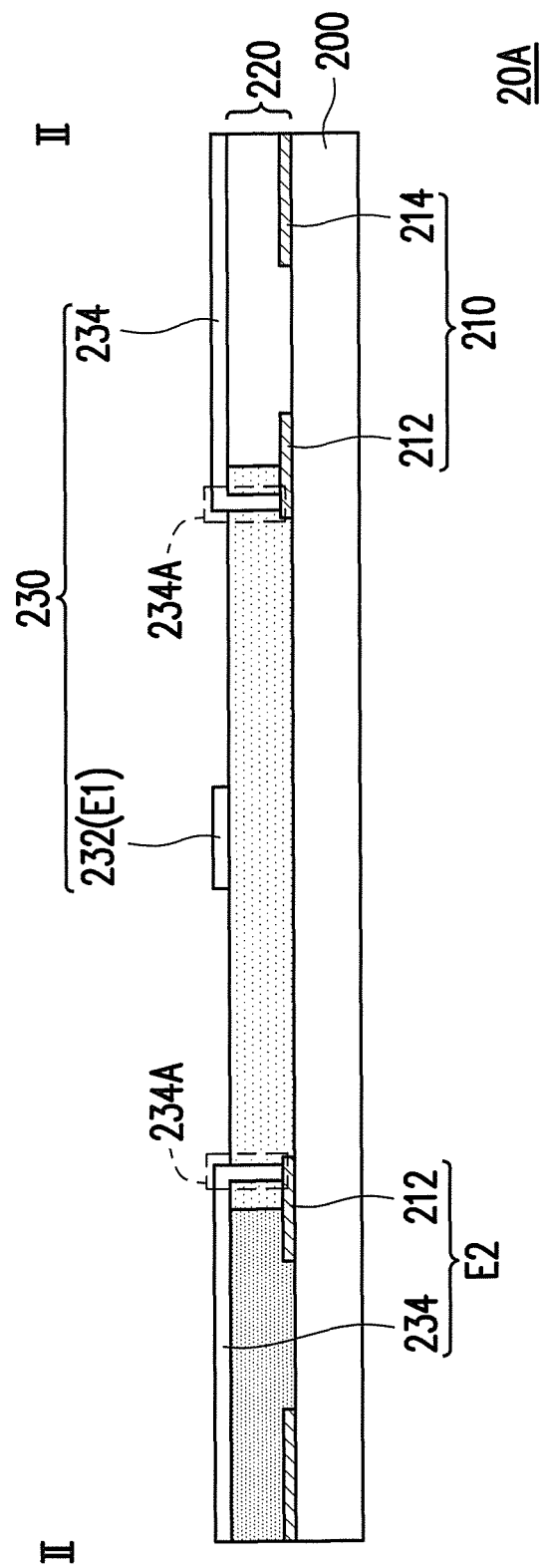
FIG. 10A is a schematic cross-sectional view illustrating a first embodiment of a partial region of the sensing apparatus shown in FIG. 8 taken along line II-II.

FIG. 10A is a schematic cross-sectional view illustrating a first embodiment of a partial region of the sensing apparatus shown in FIG. 8 taken along line II-II. Referring to FIGS. 10A and 8, in this embodiment, a sensing apparatus 20A is illustrated in a cross-sectional view as an embodiment of the sensing apparatus 20. The components in the sensing apparatus 20A may substantially have a profile design similar to that shown in FIG. 8. In the sensing apparatus 20A, at least one of the second electrode patterns 234 has a connection portion 234A connecting the first electrode pattern 212. In this embodiment, the connection portion 234A is provided at each of two ends of each of the second electrode patterns 234, and the connection portion 234A passes through the color filter layer 220 and is electrically connected to one of the first electrode patterns 212. In this way, each of the first electrode patterns 212 may physically and electrically connect with the adjacent second electrode patterns 234 in the second direction D2 in series to form the second electrode series E2.

As shown in FIG. 8, the connection between the first conductive layer 210 and the second conductive layer 230 constructs the first electrode series E1 and the second electrode series E2. The first electrode series E1 intersect the second electrode series E2, and the first electrode series E1 are not conductive with respect to the second electrode series E2, so as to implement mutual capacitance touch sensing. In other words, when the sensing apparatus 20 performs touch sensing operation, one of the first electrode series E1 and the second electrode series E2 may serve as a scan electrode, while the other may serve as a read electrode. Also, when the user's hand or a touch medium (e.g., a touch pen) contacts or approaches the sensing apparatus 20, a capacitance change of the read electrode may be used to estimate a touch position, so as to implement touch sensing.

The first conductive layer 210 in this embodiment may be a light shielding conductive layer and have a low reflectivity. The area where the first conductive layer 210 is located defines the first region 22 having a lower light transmittance, and the area where the openings 210A are located may be considered as the second region 24 having a higher light transmittance. The first conductive layer 210 may be manufactured by using a light shielding material, and a portion of the first conductive layer 210 excluding the first electrode patterns 212 may serve as the light shielding pattern 214 in the first region 22. Also, a light shielding conductive material for manufacturing the first conductive layer 210 may include a metal or a metal alloy, such as chromium, silver, aluminum, gold, copper, iron, titanium, or other metals. The second conductive layer 230 may be manufactured by using a transparent conductive material to provide a light transmittance (e.g., a light transmittance higher than that of the first conductive layer 210). The transparent conductive material may include indium tin oxide (ITO), indium zinc oxide (IZO), indium gallium zinc oxide (IGZO), indium oxide, zinc oxide, tin oxide, nano-silver wire, PEDOT:PSS, carbon nanotube, etc., for example.

A material of the color filter layer 220 may include colored resin or ink, etc. The color filter 220 has an insulating feature, and may be sandwiched between the first conductive layer 210 and the second conductive layer 230, so as to prevent the first electrode pattern 212 of the first conductive layer 210 and the second electrode pattern 232 of the second conductive layer 230 from being electrically connected with each other, thereby allowing mutual capacitance sensing. In other words, this embodiment is designed to use the color filter layer 220 having a color filtering effect as an insulating layer between the first conductive layer 210 and the second conductive layer 230. Thus, the sensing apparatus 20 is not only capable of touch sensing, but also capable of filtering colors without additionally adding another layer.

Figure 10B:
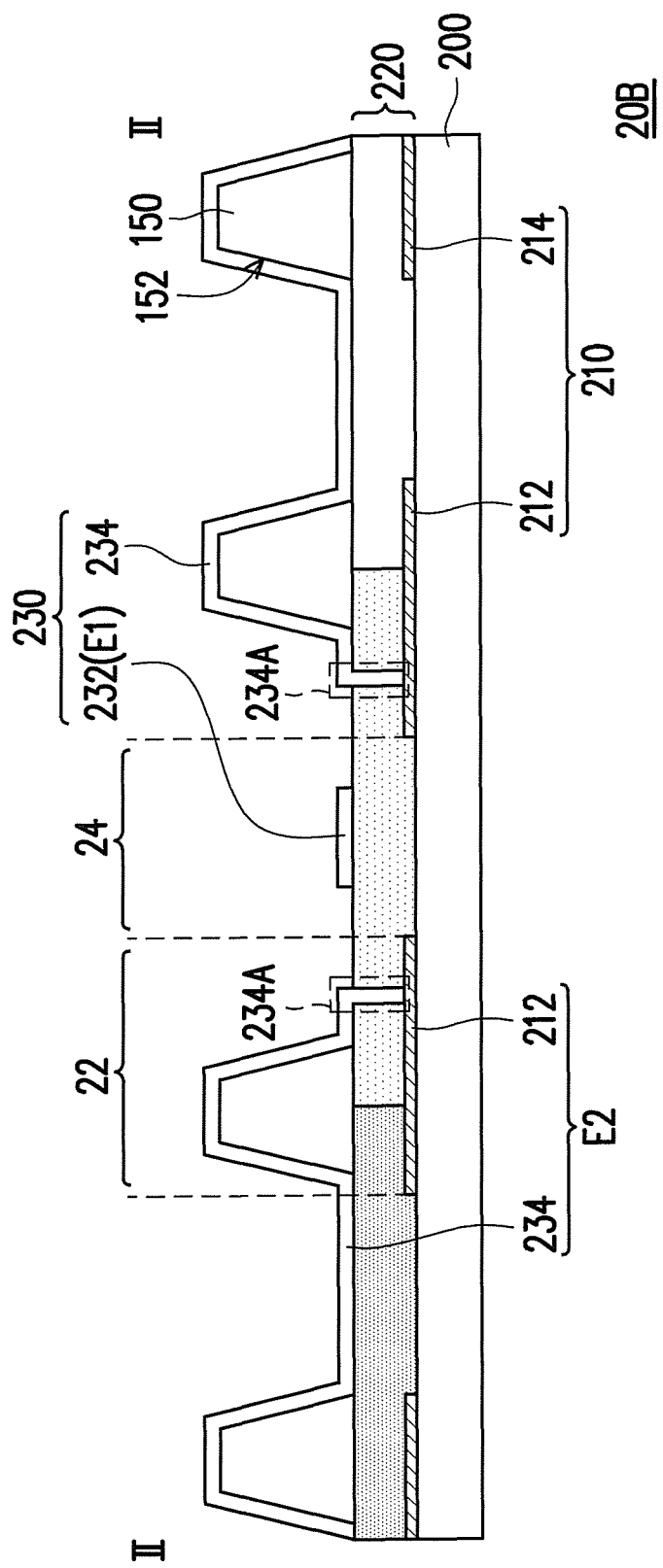
FIG. 10B is a schematic cross-sectional view illustrating a second embodiment of a partial region of the sensing apparatus shown in FIG. 8 taken along line II-II.

FIG. 10B is a schematic cross-sectional view illustrating a second embodiment of a partial region of the sensing apparatus shown in FIG. 8 taken along line II-II. Referring to FIG. 10B, in this embodiment, a sensing apparatus 20B is illustrated in a cross-sectional view as an embodiment of the sensing apparatus 20. Specifically, the sensing apparatus 20B may include the components of the sensing apparatus 20A, and further include the light guide structure 150. The second conductive layer 230 may cover the light guide structure 150, such that the light guide structure 150 is located between the second conductive layer 230 and the color filter layer 220. The design of the light guide structure 150 described herein may be similar to the light guide structure 150 above, and the light guide structure 150 is provided with the inclined sidewall 152 to guide light. When used in a display, the sensing apparatus 20B may serve for color filtering, touch sensing, and light guiding.

Figure 11:
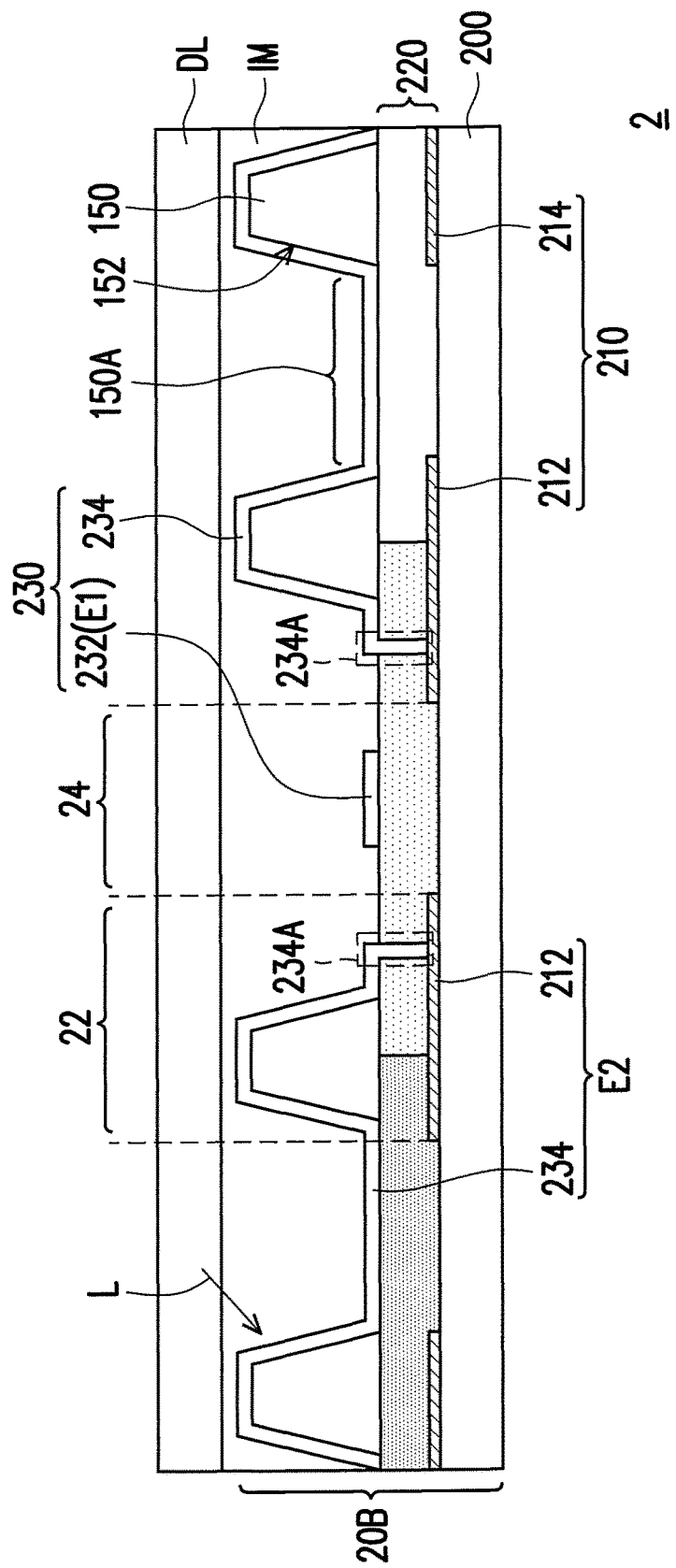
FIG. 11 is a schematic view illustrating a sensing apparatus being applied in a display according to another embodiment of the disclosure.

FIG. 11 is a schematic view illustrating a sensing apparatus being applied in a display according to another embodiment of the disclosure. Referring to FIG. 11, in this embodiment, the sensing apparatus 20B shown in FIG. 10B is used with the display layer DL to form a display 2 as an example. In other embodiments, the sensing apparatus 20A may also be combined with the display layer DL to form a display. Also, the display layer DL may be a self-illuminating display layer, such as an organic light-emitting layer, etc., or a non-self-illuminating display layer, such as a liquid crystal layer, an electro-phoretic display layer, or an electro-wetting layer, etc. The display 2 may include the sensing apparatus 20B, the capping layer IM, and the display layer DL. The capping layer IM covers the light guide structure 150 on the sensing apparatus 20B, and fills into the light guide opening 150A. The display layer DL is disposed on the capping layer IM. The refractive index of the capping layer IM is greater than the refractive index of the light guide structure 150, and the difference between the refractive index of the capping layer IM and the refractive index of the light guide structure 150 may be greater than or equal to 0.3, for example. In an embodiment, the refractive index of the capping layer IM may be in a range from 1.3 to 2, and the refractive index of the light guide structure 150 may be in a range from 1 to 1.7. A light beam L emitted by the display layer DL may be guided by the inclined sidewall 152 to be emitted out of the opening 210A of the first conductive layer 210. Display light beams emitted by the display layer DL may be collectively emitted out of the display 2 through the second region 24 where the openings 210A are located, so as to increase a display brightness of the display 2. Also, since the sensing apparatus 20B has the color filter layer 220, the sensing apparatus 20B may provide a colored display effect for the display 2 or improve color saturation of the display frame.

Figure 12:
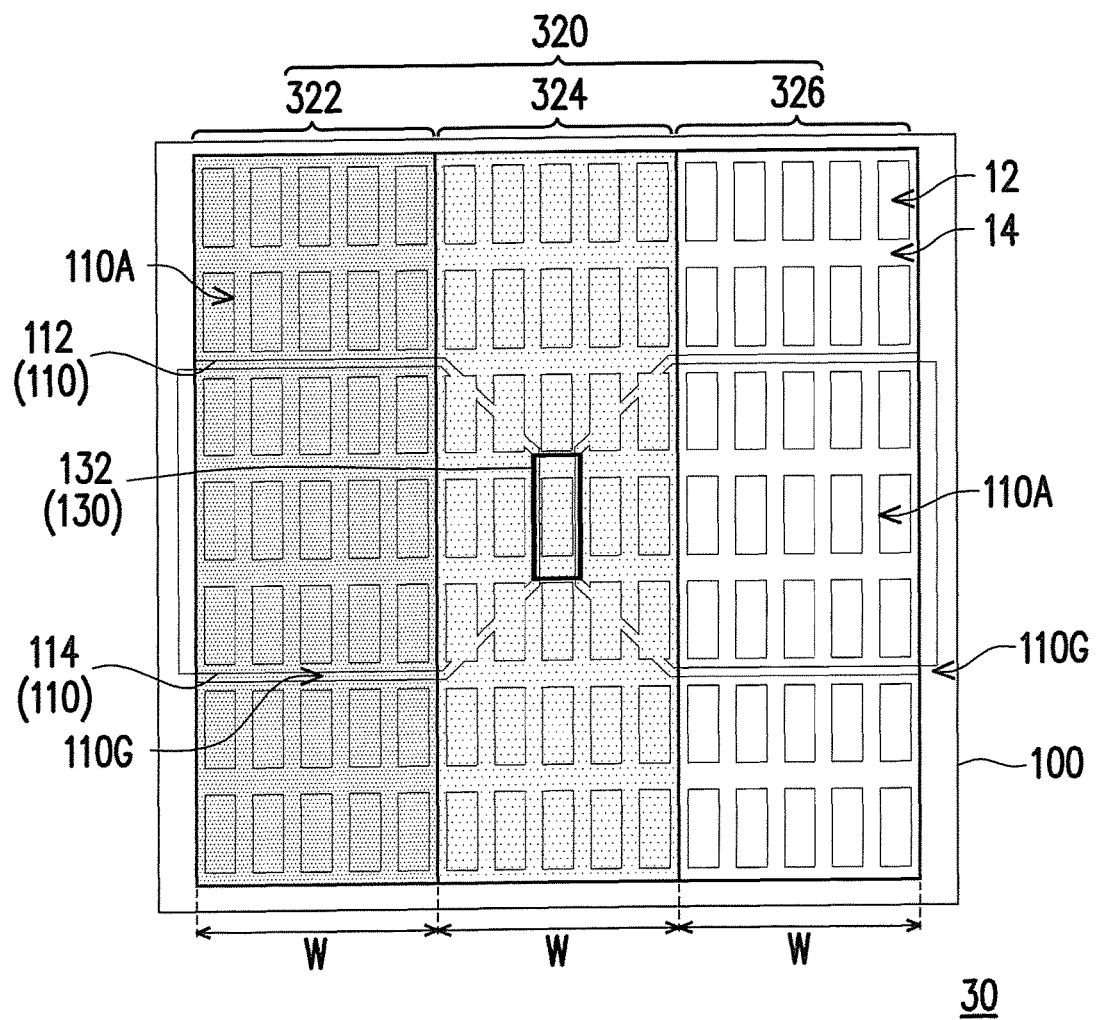
FIG. 12 is a partial schematic top view illustrating a sensing apparatus according to another embodiment of the disclosure.

FIG. 12 is a partial schematic top view illustrating a sensing apparatus according to another embodiment of the disclosure. Referring to FIG. 12, a sensing apparatus 30 includes the first conductive layer 110, a color filter layer 320, and the second conductive layer 130 disposed on the substrate 100. In addition, the designs of the first conductive layer 110 and the second conductive layer 130 herein may be similar to the first conductive layer 110 and the second conductive layer 130 shown in FIG. 1B. Details in this respect are thus not repeated in the following. Pattern designs of the color filter layer 320 and the first conductive layer 110 in this embodiment may be different from the embodiment shown in FIG. 1B in proportions. The color filter layer 320 may include a plurality of color filter patterns 322, 324, and 326, and the width W of at least one of the color filter patterns 322, 324, and 326 covers the openings 110A in multiple columns. The sensing apparatus 30 may further include the light guide structure 150 shown in FIG. 5A to guide the light, so as to increase a display brightness of the display when the sensing apparatus 30 is integrated into a display.

Figure 13:
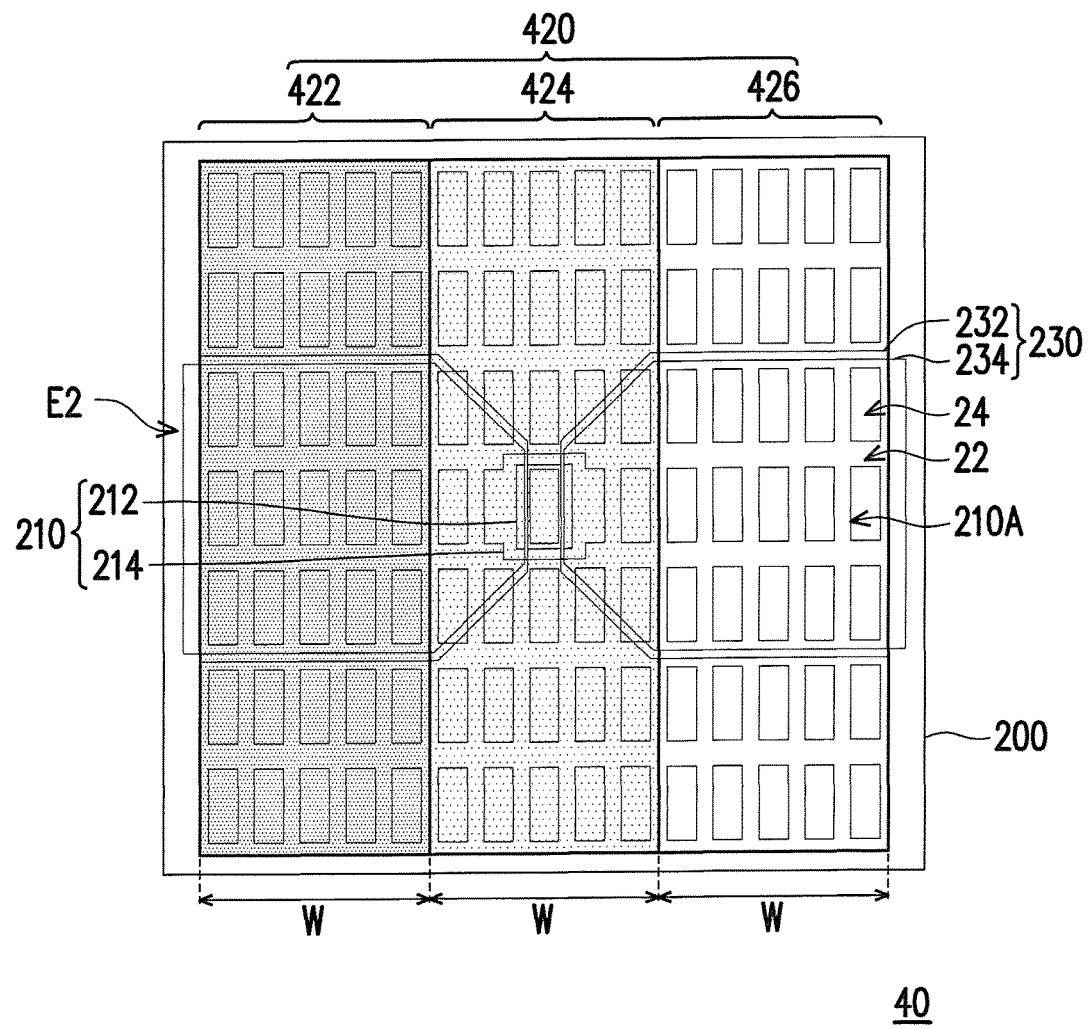
FIG. 13 is a partial schematic top view illustrating a sensing apparatus according to yet another embodiment of the disclosure.

FIG. 13 is a partial schematic top view illustrating a sensing apparatus according to yet another embodiment of the disclosure. Referring to FIG. 13, a sensing apparatus 40 includes the first conductive layer 210, a color filter layer 420, and the second conductive layer 230 disposed on the substrate 200. In addition, the designs of the first conductive layer 210 and the second conductive layer 230 herein may be similar to the first conductive layer 210 and the second conductive layer 230 shown in FIG. 8. Details in this respect are thus not repeated in the following. Pattern designs of the color filter layer 420 and the first conductive layer 210 in this embodiment may be different from the embodiment shown in FIG. 8 in proportions. The color filter layer 420 may include a plurality of color filter patterns 422, 424, and 426, and the width W of at least one of the color filter patterns 422, 424, and 426 covers the openings 210A in multiple columns. The sensing apparatus 40 may further include the light guide structure 150 shown in FIG. 5A to guide the light, so as to increase a display brightness of the display when the sensing apparatus 40 is integrated into a display.

Figure 14A:
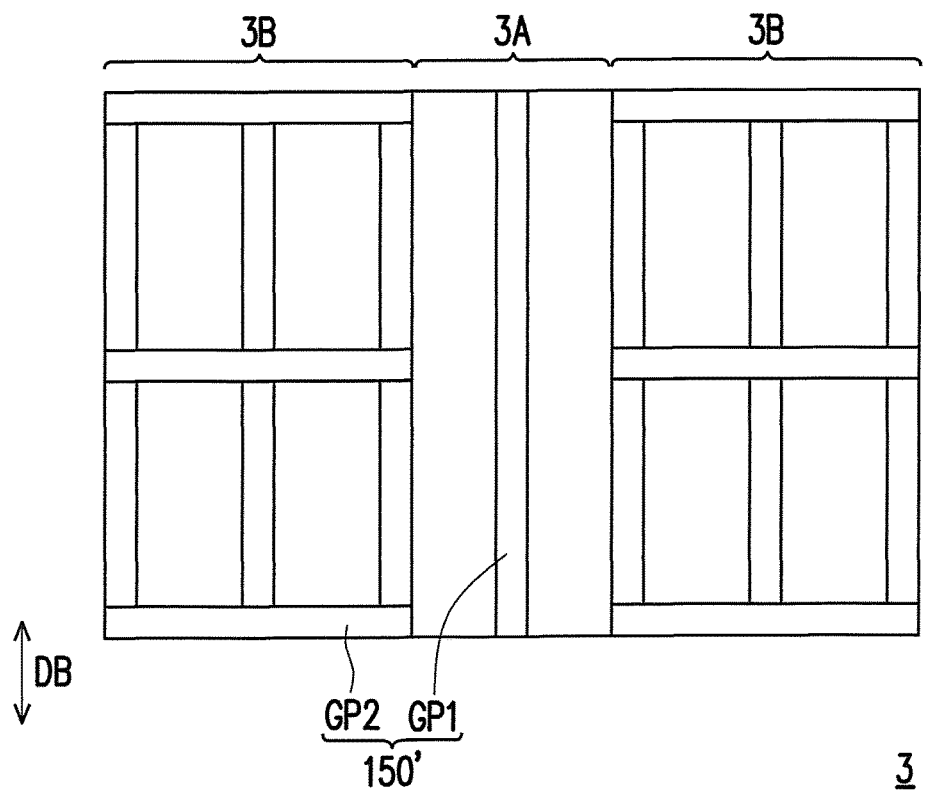
FIG. 14A is a schematic view illustrating a display according to yet another embodiment of the disclosure.
Figure 14B:
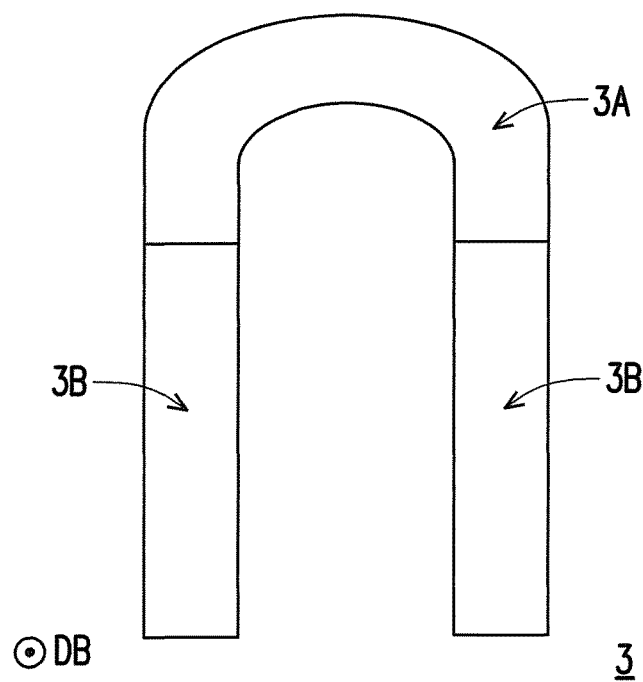
FIG. 14B is a schematic view illustrating a folded state of the display shown in FIG. 14A.

FIG. 14A is a schematic view illustrating a display according to yet another embodiment of the disclosure, and FIG. 14B is a schematic view illustrating a folded state of the display shown in FIG. 14A. As shown in FIGS. 14A and 14B, a display 3 is a flexible display. In addition, any of the sensing apparatuses described in the embodiments may be integrated into the display 3, or the display 3 may exhibit the structural design of the display 1 or the display 2. Thus, FIGS. 14A and 14B illustrate some of the components of the display 3 for schematic illustration. In addition, the display 3 may include a first section 3A and a second section 3B that are alternately arranged. In this embodiment, it is described that one first section 3A is interposed between two second sections 3B. However, the numbers of the sections are not limited thereto. As shown in FIG. 14B, the first section 3A serves as a bending region in the display 3, for example, and an extending direction of the bending region is a direction DB, for example. Here, a light guide structure 150' disposed inside the display 3 may at least have a first light guide pattern GP1 and a second light guide pattern GP2. In addition, the first light guide pattern GP1 may be located in the first section 3A, and the second light guide pattern GP2 may be located in the second sections 3B.

Figure 14C:
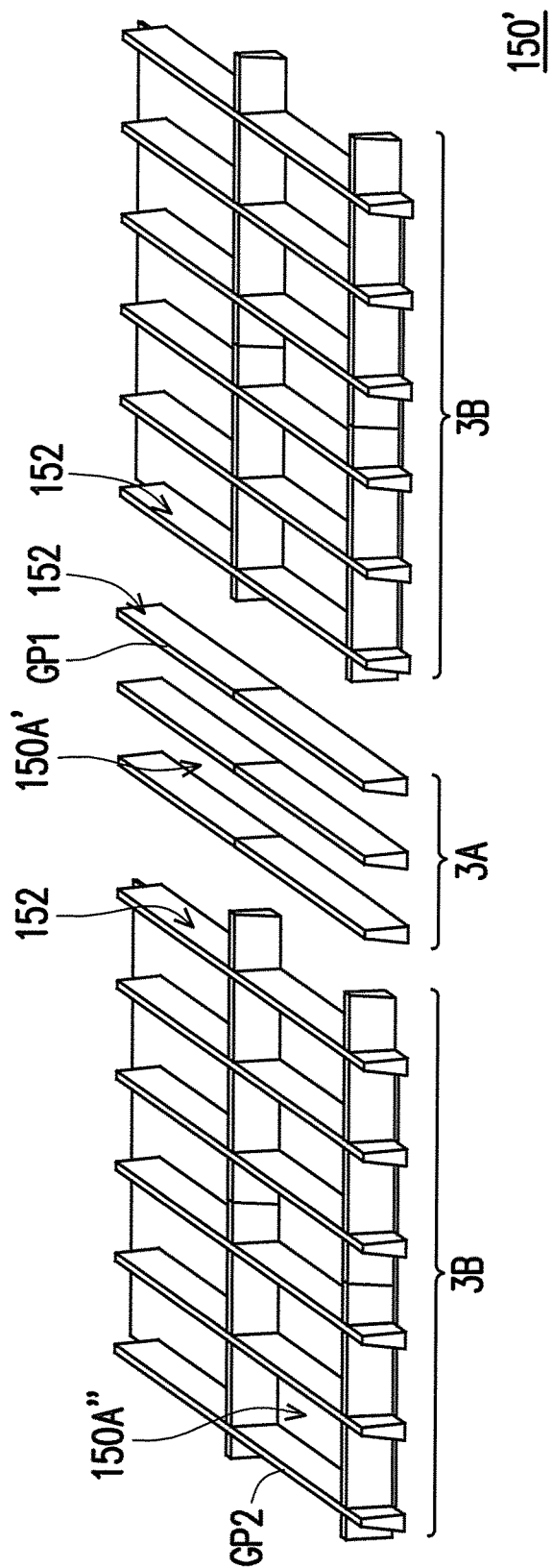
FIG. 14C is a schematic view illustrating a light guide structure of the display shown in FIG. 14A.

FIG. 14C is a schematic view illustrating a light guide structure of the display shown in FIG. 14A. Referring to FIGS. 14A and 14C at the same time, the light guide structure 150' of this embodiment includes the first light guide pattern GP1 located in the first section 3A and the second light guide pattern GP2 located elsewhere other than the first section 3A. The first section 3A of the display 3 is arranged as the bending region when the display is bent, and the first light guide pattern GP1 in the first section 3A may be set as strip-like patterns, and at least one of the strip-like patterns is substantially parallel to the direction DB. Thus, the first light guide pattern GP1 may define a light guide opening 150A' between two strip-like patterns as the light guide opening 150A. The second light guide pattern GP2 may be a lattice-like pattern as shown in FIG. 4. In addition, the second light guide pattern GP2 may define a plurality of grid-like light guide openings 150A" as the light guide openings 150A. Here, in the extending direction of the first light guide pattern GP1, a length that the strip-like light guide opening 150A' extends is greater than a length that the grid-like light guide opening 150A' extends. When the display 3 is bent, as in a state shown in FIG. 14B, the first light guide pattern GP1 is not damaged or broken easily. Thus, a lifetime of the display 3 may be lengthened. In addition, the inclined sidewall 152 is disposed in the first light guide pattern GP1 and/or the second light guide pattern GP2. With the inclined sidewall 152 provided, display light beams of the display 3 may be guided more effectively for the user's viewing.

Figure 15:
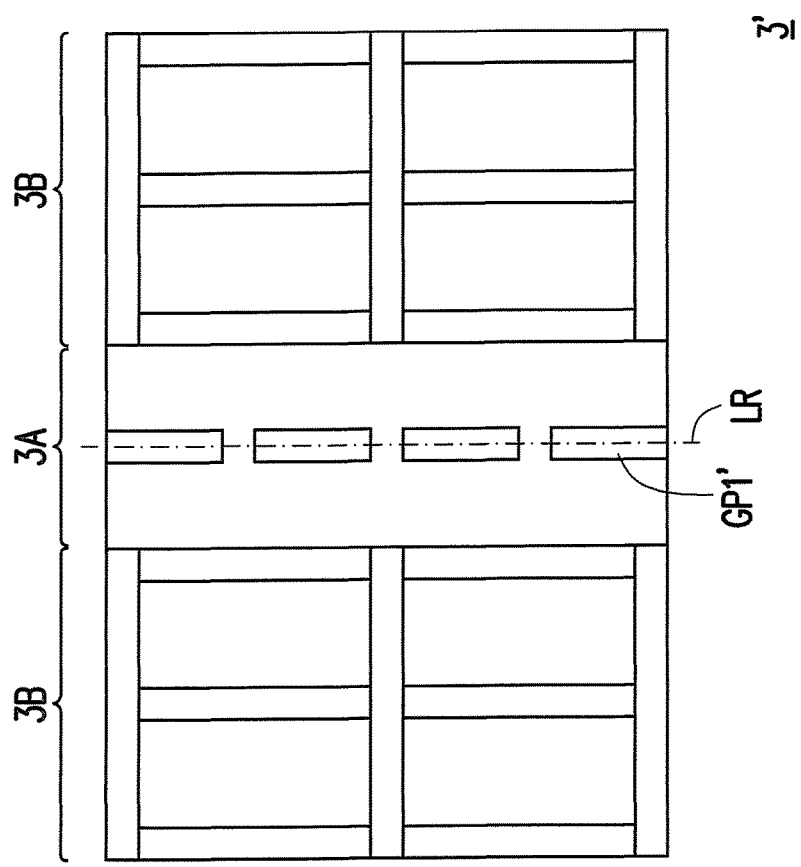
FIG. 15 is a view illustrating an alternative embodiment of the display shown in FIG. 14A.

The light guide pattern GP1 in the first section 3A may also be separated into a plurality of segments, as shown in FIG. 15. FIG. 15 is a view illustrating an alternative embodiment of the display shown in FIG. 14A. In the first section 3A of a display 3' shown in FIG. 15, a first light guide pattern GP1' may be arranged along a path LR, and the path LR may be substantially parallel to a bending axis that the display 3' is expected to be bent.

In the sensing apparatus in an embodiment of the disclosure, the color filter layer is used as the insulating layer between two conductive layers. The sensing apparatus has a color filtering capability and may provide a colored display effect for the display or improve color saturation of the display frame. Furthermore, a sensing apparatus according to an embodiment of the disclosure allows light to pass through the second region. When the sensing apparatus is integrated into a display, a display frame presented by the display has an acceptable display contrast. In the sensing apparatus according to an embodiment of the disclosure, the electrode patterns of the conductive layer are disposed in the region having a lower light transmittance or the electrode patterns of the conductive layer define the region having a lower transmittance, such that the light beams may be collectively emitted from the region having a higher light transmittance. When the sensing apparatus is integrated into a display, the display brightness of the display may be increased. Even when using the display in an environment having a higher ambient brightness, the user may able to view the display frame clearly. Moreover, the sensing apparatus in some embodiments of the disclosure includes the light guide structure. The light guide structure is designed to guide the light beams to the region having a higher light transmittance, so as to increase the display brightness of the display.

It will be clear that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A sensing apparatus, having a first region and a second region, wherein a light transmittance of the first region is lower than a light transmittance of the second region, and the apparatus comprises:
a substrate;

a first conductive layer, disposed on the substrate, located in the first region, and comprising a plurality of first electrode patterns;

a color filter layer, disposed on the substrate and covering the first conductive layer; and a second conductive layer, disposed on the color filter layer, and comprising a plurality of second electrode patterns, wherein at least one of the second electrode patterns has a connection portion, the connection portion passes through the color filter layer and is electrically connected with one of the first electrode patterns, the first electrode patterns and the second electrode patterns form a plurality of first electrode series and a plurality of second electrode series, the first electrode series and the second electrode series intersect each other, and the connection portion is located at an intersection of one of the first electrode series and one of the second electrode series.

2. The sensing apparatus as claimed in claim 1, wherein the first conductive layer is a light shielding conductive layer, and an area where the first conductive layer is distributed defines the first region.

3. The sensing apparatus as claimed in claim 1, further comprising a light shielding layer, wherein the light shielding layer is disposed between the color filter layer and the substrate, the first conductive layer is distributed in correspondence with the light shielding layer, and an area where the light shielding layer is distributed defines the first region.

4. The sensing apparatus as claimed in claim 1, wherein the second region comprises a plurality of openings and a plurality of gaps, the openings are arranged as an array, and the gaps define profiles of the first electrode patterns.

5. The sensing apparatus as claimed in claim 4, wherein the color filter layer has a plurality of color filter patterns, and an interface between adjacent color filter patterns is located in the first region.

6. The sensing apparatus as claimed in claim 5, wherein the openings are arranged to form a plurality of columns, and a coverage of at least one of the color filter patterns does not exceed the openings in one column.

7. The sensing apparatus as claimed in claim 5, wherein the openings are arranged to form a plurality of columns, and at least one of the color filter patterns covers the openings in more than one column.

8. The sensing apparatus as claimed in claim 1, wherein each of the second electrode patterns has the connection portion, a part of the first electrode patterns form the first electrode series, and another part of the first electrode patterns are connected with the second electrode patterns to form the second electrode series.

9. The sensing apparatus as claimed in claim 1, wherein a part of the second electrode patterns forms the second electrode series, and each of another part of the second electrode patterns has the connection portion and the another part of the second electrode patterns are connected with the first electrode patterns to form the first electrode series.

10. The sensing apparatus as claimed in claim 9, wherein the part of the second electrode patterns and the another part of the second electrode patterns are separated by a gap and independent from each other.

11. The sensing apparatus as claimed in claim 1, further comprising a light guide structure disposed on the color filter layer, wherein the light guide structure has a plurality of light guide openings, and the light guide openings are arranged as an array and expose the second region.

12. The sensing apparatus as claimed in claim 11, wherein the light guide structure has a inclined sidewall at least one of the light guide openings, and an area of the light guide openings gradually increases from one end close to the substrate along a direction away from the substrate.

13. The sensing apparatus as claimed in claim 11, wherein the light guide structure is located between the second conductive layer and the color filter layer.

14. The sensing apparatus as claimed in claim 11, further comprising an isolation layer disposed between the color filter layer and the light guide structure.

15. The sensing apparatus as claimed in claim 11, further comprising a capping layer, wherein the light guide structure is located between the capping layer and the color filter layer, and a refractive index of the capping layer is higher than a refractive index of the light guide structure.

16. The sensing apparatus as claimed in claim 11, wherein a material of the second conductive layer comprises a transparent conductive material.

17. The sensing apparatus as claimed in claim 11, wherein the substrate has at least one first section and at least one second section that are adjacent, the light guide structure comprises a first light guide pattern located in the first section and a second light guide pattern located in the second section, and a profile of the first light guide pattern is different from a profile of the second light guide pattern.

18. The sensing apparatus as claimed in claim 17, wherein the first light guide pattern is a strip-like pattern, and the second light guide pattern is a lattice-like pattern.

19. The sensing apparatus as claimed in claim 17, wherein a light guide opening defined by the first light guide pattern comprises at least one strip-like light guide opening, and a light guide opening defined by the second light guide pattern comprises a plurality of grid-like light guide openings.

20. The sensing apparatus as claimed in claim 19, wherein in an extending direction of the first light guide pattern, a length that the strip-like light guide opening extends is greater than a length that the grid-like light guide opening extends.

* * * * *